(12) United States Patent
Nakagawa et al.

(10) Patent No.: US 10,953,553 B2
(45) Date of Patent: Mar. 23, 2021

(54) GRIPPING HAND

(71) Applicant: FANUC CORPORATION, Yamanashi (JP)

(72) Inventors: Hiroshi Nakagawa, Yamanashi (JP); Yuuki Kondou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 133 days.

(21) Appl. No.: 16/218,939

(22) Filed: Dec. 13, 2018

(65) Prior Publication Data
US 2019/0202070 A1    Jul. 4, 2019

(30) Foreign Application Priority Data

Dec. 28, 2017 (JP) .............................. JP2017-254373

(51) Int. Cl.
*B25J 15/12* (2006.01)
*B25J 15/10* (2006.01)
(Continued)

(52) U.S. Cl.
CPC ............. *B25J 15/12* (2013.01); *B25J 9/1612* (2013.01); *B25J 15/0023* (2013.01);
(Continued)

(58) Field of Classification Search
CPC .... B25J 15/00625; B25J 15/12; B25J 9/1612; B25J 15/0061; B25J 15/0023; B25J 15/106
(Continued)

(56) References Cited

U.S. PATENT DOCUMENTS 3,343,864 A * 9/1967 Baer .................... B25J 15/0009
294/119.3
3,981,528 A    9/1976 Andorf et al.
(Continued)

FOREIGN PATENT DOCUMENTS

CN    107214729 A    9/2017
EP    1645374 A1    4/2006
(Continued)

OTHER PUBLICATIONS

Office Action dated Nov. 19, 2019 in corresponding Japanese Application No. 2017-254373; 11 pages including English-language translation.
(Continued)

*Primary Examiner* — Paul T Chin
(74) *Attorney, Agent, or Firm* — Maier & Maier, PLLC

(57) ABSTRACT

This gripping hand has a base member and a number of fingers arranged about an axis line passing through the base member, wherein each of the fingers has a flexible finger part having flexibility and a finger base member for supporting the basal end side of the flexible finger part, the gripping hand is provided with a number of link mechanisms that are supported by the base member and that support the respective number of finger base members, and each of the link mechanisms allows the finger base member supported thereby to move relative to the base member such that the orientation of the finger base member supported thereby does not substantially change relative to the base member.

16 Claims, 33 Drawing Sheets

(51) Int. Cl.
*B25J 15/00* (2006.01)
*B25J 9/16* (2006.01)
*B25J 15/02* (2006.01)

(52) U.S. Cl.
CPC ........... *B25J 15/0266* (2013.01); *B25J 15/10* (2013.01); *B25J 15/106* (2013.01)

(58) Field of Classification Search
USPC ................. 294/208, 213, 65, 119.3, 99.1
See application file for complete search history.

(56) References Cited

U.S. PATENT DOCUMENTS

| | | | |
|---|---|---|---|
| 4,768,428 A * | 9/1988 | Silvestrini | A23N 4/04 294/106 |
| 5,251,538 A * | 10/1993 | Smith | F16J 3/06 92/34 |
| 8,585,111 B2 * | 11/2013 | Nammoto | B25J 15/10 294/106 |
| 9,016,742 B2 * | 4/2015 | Nammoto | B25J 13/082 294/106 |
| 9,089,976 B2 * | 7/2015 | Dan | B25J 15/0009 |
| 9,782,902 B1 * | 10/2017 | Kim | B25J 15/0009 |
| 10,179,411 B2 * | 1/2019 | Lessing | B25J 9/0027 |
| 10,189,168 B2 * | 1/2019 | Lessing | B25J 15/10 |
| 10,889,004 B2 * | 1/2021 | Lessing | B25J 15/0004 |
| 2006/0145494 A1 | 7/2006 | Nihei et al. | |
| 2011/0148132 A1 | 6/2011 | Park et al. | |
| 2014/0028040 A1 * | 1/2014 | Oda | B25J 15/0004 294/115 |
| 2014/0132018 A1 | 5/2014 | Claffee et al. | |
| 2014/0132020 A1 | 5/2014 | Claffee et al. | |
| 2014/0132021 A1 | 5/2014 | Claffee et al. | |
| 2015/0076850 A1 | 3/2015 | Claffee et al. | |
| 2015/0090113 A1 | 4/2015 | Galloway | |
| 2015/0190931 A1 | 7/2015 | Claffee et al. | |
| 2015/0360372 A1 * | 12/2015 | Schiettecatte | B25J 15/12 294/197 |
| 2017/0203443 A1 * | 7/2017 | Lessing | B25J 9/0027 |
| 2018/0311829 A1 * | 11/2018 | Curhan | B25J 15/0033 |
| 2020/0215700 A1 * | 7/2020 | Bao | B25J 15/0009 |

FOREIGN PATENT DOCUMENTS

| | | |
|---|---|---|
| JP | S51-23956 A | 2/1976 |
| JP | H02-93572 U | 7/1990 |
| JP | H08-294885 A | 11/1996 |
| JP | H10-235586 A | 9/1998 |
| JP | H10-249773 A | 9/1998 |
| JP | 2002-036159 A | 2/2002 |
| JP | 2006-102920 A | 4/2006 |
| JP | 2008-178939 A | 8/2008 |
| JP | 2009-023067 A | 2/2009 |
| JP | 2010-076050 A | 4/2010 |
| JP | 2011-183475 A | 9/2011 |
| JP | 2015-020246 A | 2/2015 |
| JP | 2015-533669 A | 11/2015 |
| JP | 2016-003762 A | 1/2016 |
| JP | 2016-508455 A | 3/2016 |
| JP | 2016-535206 A | 11/2016 |
| WO | 2014/074840 A1 | 5/2014 |
| WO | 2014/131810 A1 | 9/2014 |
| WO | 2015/050852 A1 | 4/2015 |

OTHER PUBLICATIONS

Search Report dated Oct. 30, 2019 in corresponding Japanese Application No. 2017-254373; 38 pages including English-language translation.

* cited by examiner

GRIPPING HAND

CROSS-REFERENCE TO RELATED APPLICATIONS

This application is based on and claims priority to Japanese Patent Application No. 2017-254373 filed on Dec. 28, 2017, the entire content of which is incorporated herein by reference.

FIELD

The present invention relates to a gripping hand.

BACKGROUND

There is a known gripping hand provided with: a base member that is formed by connecting eight link members in series and that can be deformed into a regular octagonal shape and a rectangular shape; and a plurality of fingers each of which is supported by any of the eight link members of the base member, wherein each of the fingers has a plurality of joints, and the shape of the base member is changed according to the shape of a grasp object (refer to, for example, Japanese Unexamined Patent Application, Publication No. 2010-076050).

There is also a known gripping hand provided with: a base member formed by connecting four link members in a manner arranged in a prescribed direction; and a plurality of fingers supported on one side and other side of the base member in the above-described prescribed direction, wherein each of the fingers has a plurality of joints, the base member is deformed so that the four link members are arranged in one straight line when a large object is to be gripped, and the link members in the middle in the above-described prescribed direction are folded so that the link members at the one end and the other end in the above-described prescribed direction approach each other when a small object is to be gripped (refer to, for example, Japanese Unexamined Patent Application, Publication No. 2008-178939).

There is also a known gripping hand provided with: a base member; and a plurality of fingers each of which is mounted on the base member so as to be swivelable, wherein each of the fingers has a plurality of joints, and a grasp object is gripped by bending the joints of each of the fingers (refer to, for example, Japanese Unexamined Patent Application, Publication No. 2015-533669).

SUMMARY

A first aspect of the present invention is a gripping hand having: a base member; and a plurality of fingers arranged about an axis line that passes through or penetrates the base member, wherein each of the fingers has a flexible finger part having flexibility and a finger base member for supporting a basal end side of the flexible finger part, wherein the gripping hand further comprises a plurality of link mechanisms that are supported by the base member or by a member mounted on the base member and that respectively support the plurality of finger base members, and wherein each of the link mechanisms allows the corresponding finger base member supported thereby to move relative to the base member such that orientation of the finger base member supported thereby does not substantially change relative to the base member.

DETAILED DESCRIPTION

A gripping hand according to a first embodiment of the present invention will now be described with reference to the drawings. The gripping hand of this embodiment is mounted at a distal end of, for example, a robot (not shown in the figure) when it is used.

Figure 1:
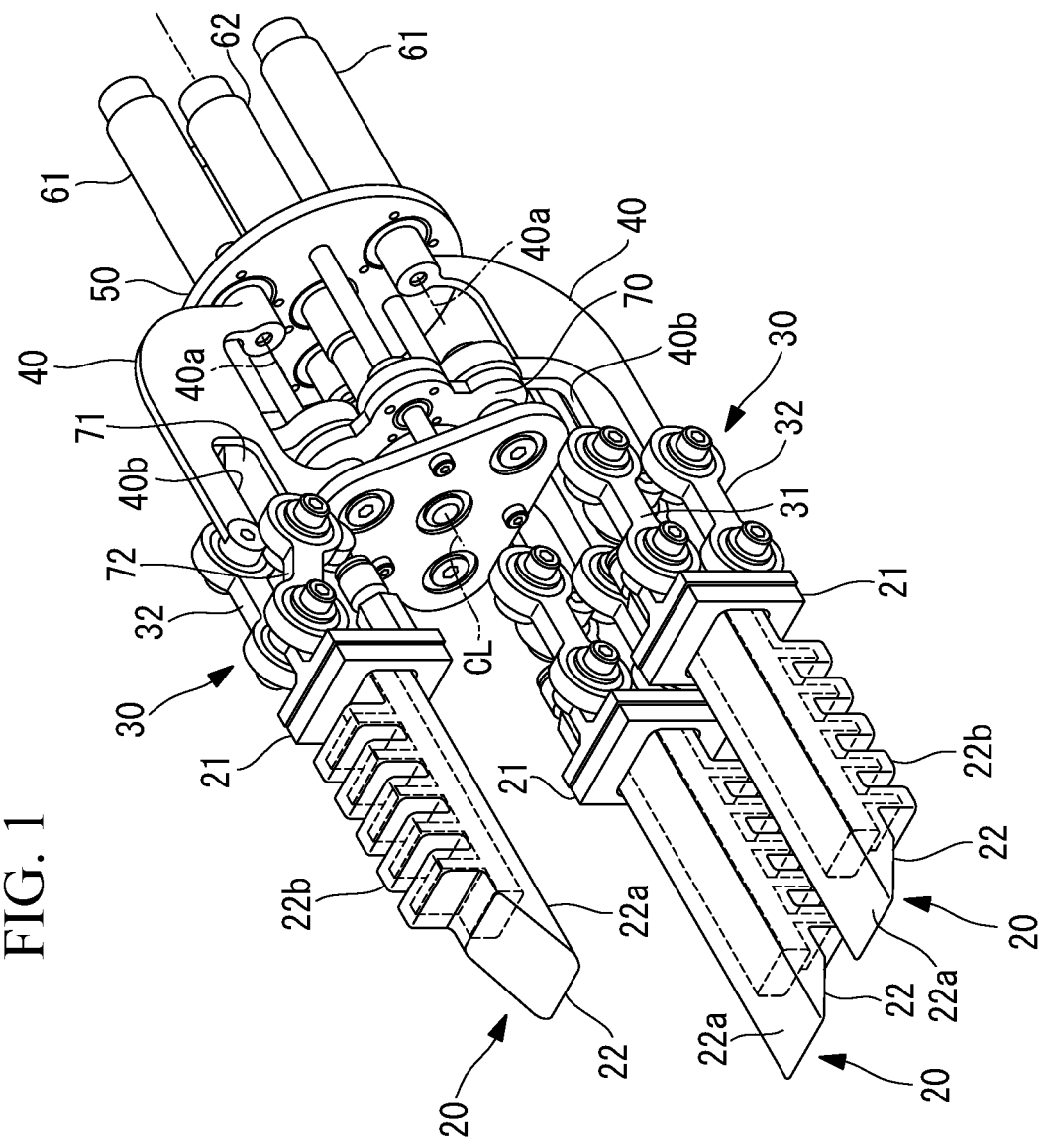
FIG. 1 is a perspective view of a hand according to a first embodiment of the present invention.
Figure 2:
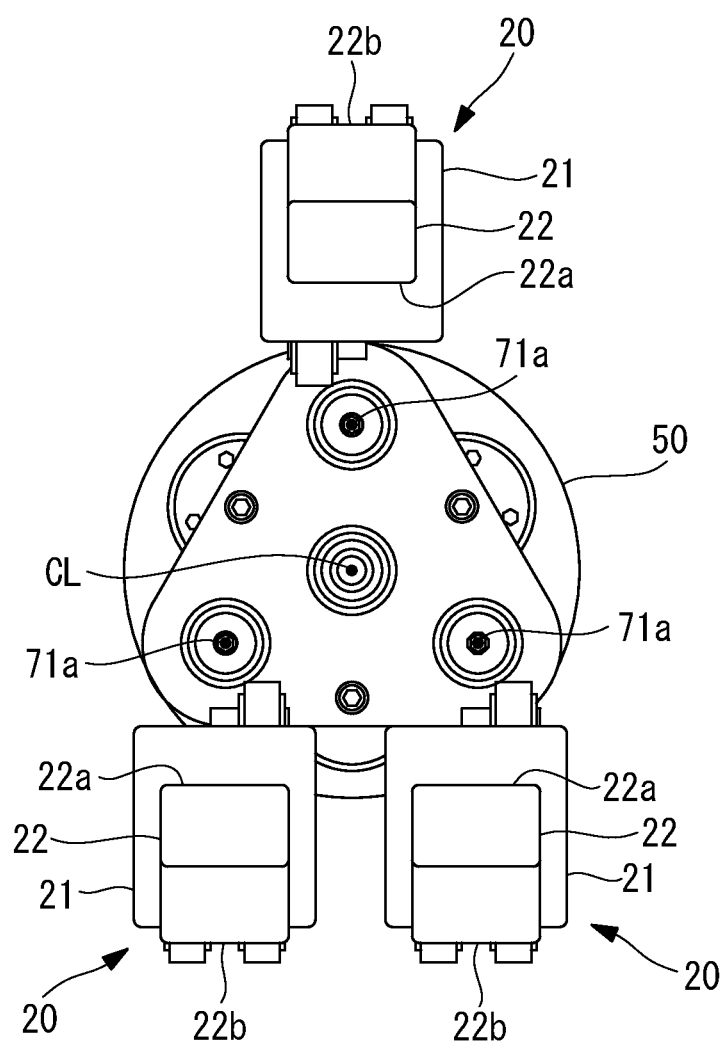
FIG. 2 is a side elevational view of the hand according to the first embodiment.
Figure 3:
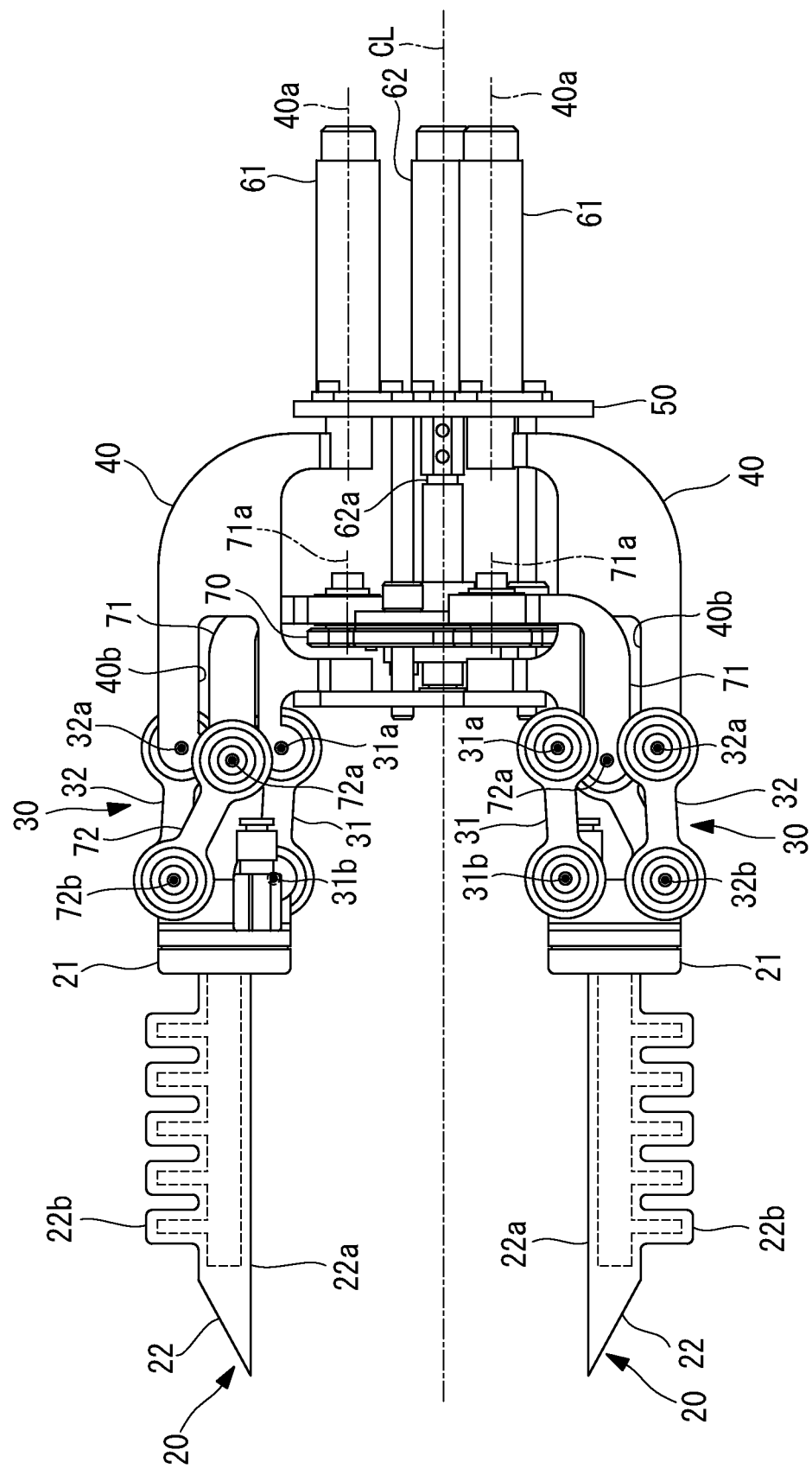
FIG. 3 is a front elevational view of the hand according to the first embodiment.

As shown in FIGS. 1 to 3, this gripping hand has three fingers 20. The number of fingers 20 is not limited to three and may be two, or four or more.

Each of the three fingers 20 is supported on a base member 50 via a parallel link (link mechanism) 30 and a swiveling member 40. One end of each of the three swiveling members 40 is supported on the base member 50 so as to be swivelable about a corresponding swiveling axis 40a, and three first actuators (swivel drive devices) 61 for rotating the three swiveling members 40 about the respective swiveling axes 40a are mounted on the base member 50. Each of the first actuators 61 is formed of, for example, a rotary motor, including a rotational position sensor, such as an encoder, for detecting the rotational position of the output shaft thereof, and including a drive current sensor for detecting a drive current thereof.

In this embodiment, the three swiveling axes 40a are disposed parallel to a hand central line CL, are separated from the hand central line CL by the same distance, and are arranged at equal angular intervals about the hand central line CL. In addition, in this embodiment, the hand central line CL is aligned with the central axis of the base member 50. Hereinafter, a direction parallel to the hand central line CL may be referred to as a hand axial direction, and a direction that passes through the hand central line CL and that is orthogonal to the hand central line CL may be referred to as a hand radial direction. Furthermore, hereinafter, a direction that passes through a swiveling axis 40a and that is orthogonal to the swiveling axis 40a may be referred to as a finger radial direction.

One end of a first link member 31 is connected to the other end of the corresponding swiveling member 40 so as to be swingable about a swing axis 31a, and one end of a second link member 32 is connected to the other end of the corresponding swiveling member 40 so as to be swingable about a swing axis 32a. In addition, the other end of the first link member 31 is connected to a finger base member 21 of the corresponding finger 20 so as to be swingable about a swing axis 31b, and the other end of the second link member 32 is connected to the finger base member 21 so as to be swingable about a swing axis 32b. The swing axis 31a, the swing axis 31b, the swing axis 32a, and the swing axis 32b are parallel to one another.

The swing axis 31a and the swing axis 32a are separated from the corresponding swiveling axis 40a by different distances, and the swing axis 31b and the swing axis 32b are separated from the corresponding swiveling axis 40a by different distances. In this embodiment, the swing axis 32a is further away from the corresponding swiveling axis 40a than the swing axis 31a is, and the swing axis 32b is further away from the corresponding swiveling axis 40a than the swing axis 31b is.

Thus, the parallel link 30 is configured by swingably connecting one end of each of the first link member 31 and the second link member 32 to the other end of the corresponding swiveling member 40 and by swingably connecting the other end of each of the first link member 31 and the second link member 32 to the finger base member 21 of the corresponding finger 20. With the parallel links 30, the finger base members 21 can move in a direction in which the link members 31 and 32 swing, without changing the orientations thereof relative to the swiveling members 40.

For example, when a first link member 31 and a second link member 32 swing in a state where the corresponding swiveling member 40 is positioned by the first actuator 61 such that the swing axis 31a and the swing axis 32a are arranged in the hand radial direction, the finger base member 21 moves in the hand radial direction, but the orientation of the finger base member 21 relative to the swiveling member 40 does not change. In other words, the finger base member 21 moves in the hand radial direction (finger radial direction) while keeping an imaginary line passing through the swing axis 31a and the swing axis 32a in the hand radial direction (finger radial direction) parallel to an imaginary line passing through the swing axis 31b and the swing axis 32b in the hand radial direction (finger radial direction).

As shown in FIGS. 1 and 3, this gripping hand has: an axial-direction moving member (drive mechanism) 70 disposed in a manner separated from the base member 50 in the hand axial direction; three first drive link members (drive mechanism) 71 supported on the axial-direction moving member 70; and three second drive link members (drive mechanism) 72 that are connected to the respective three first drive link members 71.

One end of each of the first drive link members 71 is supported on the axial-direction moving member 70 so as to be swivelable about a swiveling axis 71a parallel to the corresponding swiveling axis 40a (refer to FIG. 1).

In this embodiment, the swiveling axes 71a of the three first drive link members 71 are aligned with the swiveling axes 40a of the respective three swiveling members 40. In addition, one end of each of the second drive link members 72 is connected to the other end of the corresponding first drive link member 71 so as to be swingable about a swing axis 72a parallel to the swing axis 31a and the swing axis 32a, and the other end of the second drive link member 72 is connected to the finger base member 21, the other end side of the first link member 31, or the other end side of the second link member 32 so as to be swingable about a swing axis 72b parallel to the swing axis 31b and the swing axis 32b.

As one example, this embodiment is configured such that: the swing axis 72a and the swing axis 32b are aligned with each other; the other end side of the first drive link member 71 or one end side of the second drive link member 72 is disposed in a notch 40b formed on the other end side of the swiveling member 40; and these members and the other end side of the swiveling members 40 are arranged in the finger radial direction. However, the present invention is not limited to this configuration.

Due to the above-described configuration, when the swiveling members 40 are swiveled by the first actuators 61 relative to the base member 50 about the swiveling axes 40a, the first drive link members 71 also swivel following the swiveling of the swiveling members 40.

One end of each of the second drive link members 72 is connected to the other end of the corresponding first drive link member 71 so as to be swingable about the swing axis 72a, and the second drive link member 72 can be tilted relative to the corresponding swiveling axis 40a. In addition, a second actuator (drive mechanism) 62 formed of a rotary motor is mounted on the base member 50, and an output shaft 62a of the second actuator 62 is engaged with the axial-direction moving member (drive mechanism) 70 with a threaded member, such as a trapezoidal screw or a ball screw, interposed therebetween. For this reason, when the output shaft 62a of the second actuator 62 is rotated, the axial-direction moving member 70 can be moved in a direction along the hand central line CL (hand axial direction). With the above-described structure, the first link members 31 and the second link members 32 swing in the finger radial direction according to the movement of the axial-direction moving member 70, by means of the second actuator 62, along the hand central line CL, thereby causing the finger base members 21 to move in the finger radial direction. The second actuator 62 includes a rotational position sensor, such as an encoder, for detecting a rotational position of the output shaft 62a thereof and includes a drive current sensor for detecting a drive current thereof.

The basal end of a flexible finger part 22 that is formed of a material having flexibility, such as a material having rubber-like elasticity, and that has therein a hollow portion to which a fluid (air) can be supplied is mounted on one surface of each of the finger base members 21. The hollow portion of the flexible finger part 22 is blocked by the above-described one surface of the finger base member 21 at the basal end of the flexible finger part 22. In addition, the other end sides of the first link member 31 and the second link member 32 of the parallel link 30 are connected to the opposite side of the finger base member 21 which is opposite to the above-described one surface.

The side of the flexible finger part 22 disposed on the hand central line CL side constitutes a gripping wall 22a that does not easily stretch, the side of the flexible finger part 22 disposed at a position further away from the hand central line CL than the gripping wall 22a is formed into a stretchable wall 22b that easily stretches. The stretchable wall 22b has, for example, an undulated shape (corrugate shape).

For this reason, in a state where the air pressure in the hollow portion is identical to the external air pressure, a direction in which the gripping wall 22a of each of the flexible finger parts 22 extends is substantially aligned with a direction in which the hand central line CL extends. However, when the air pressure in the hollow portion becomes higher than the external air pressure, the stretchable wall 22b of the flexible finger part 22 stretches, thus causing the distal end side of the flexible finger part 22 to deflect towards the hand central line CL side.

Figure 4:
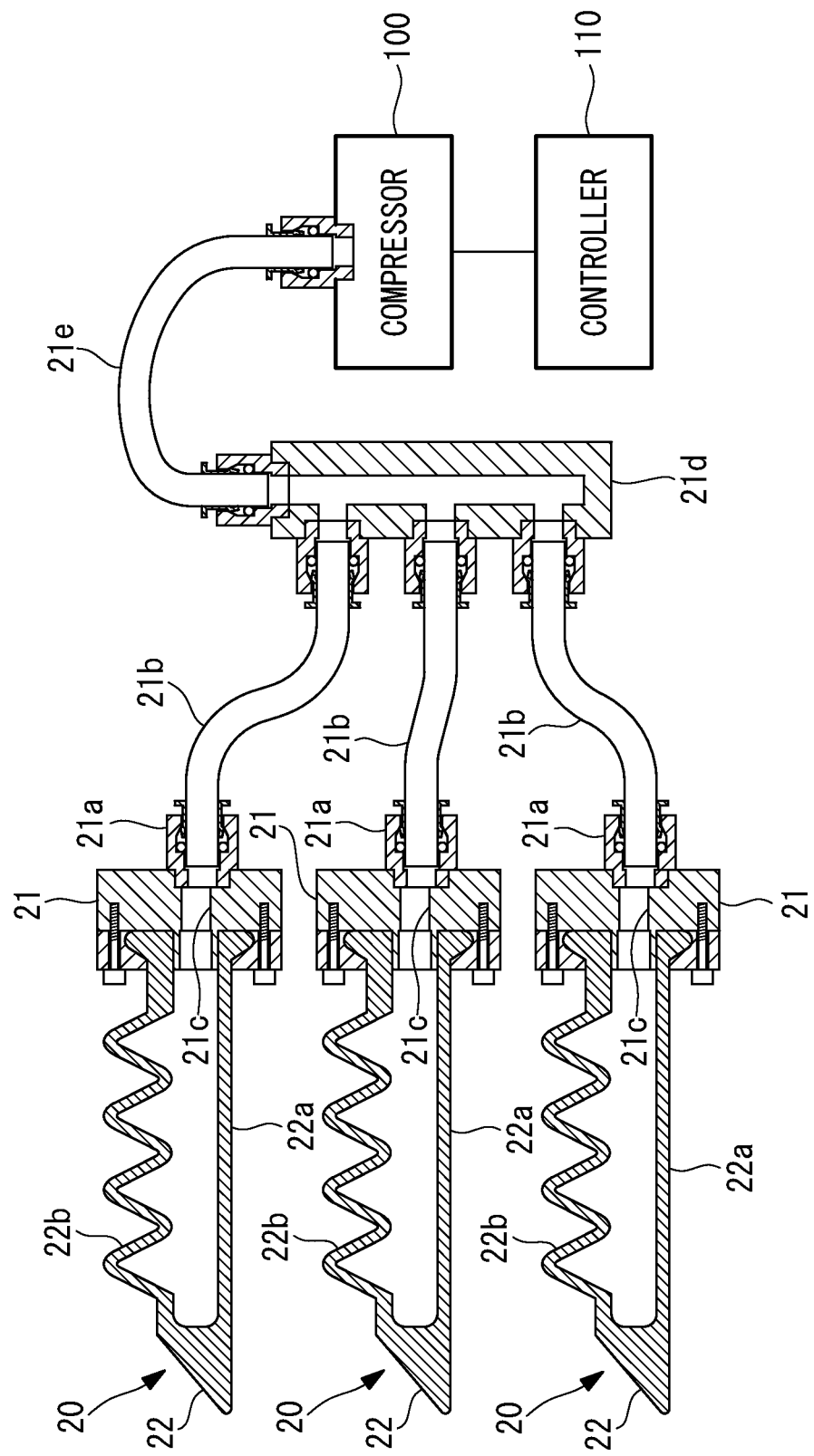
FIG. 4 is a schematic configuration diagram of the hand according to the first embodiment.

The hollow portions in the flexible finger parts 22 of the fingers 20 are connected to a compressor (fluid supply and discharge device) 100, such as a compressor. As shown in FIG. 4, a coupler 21a is fixed to the above-described opposite side in each of the finger base members 21, and one end of a tube (fluid flow channel) 21b is connected to the coupler 21a. For the coupler 21a, any coupler that has a well-known structure allowing an end of the tube 21b to be attached thereto and detached therefrom is employable. In each of the finger base members 21, a pathway 21c for connecting the interior of the coupler 21a and the hollow portion in the flexible finger part 22 is formed. The other ends of the tubes 21b are connected to the compressor 100 via a hub 21d and a tube 21e.

Figure 9:
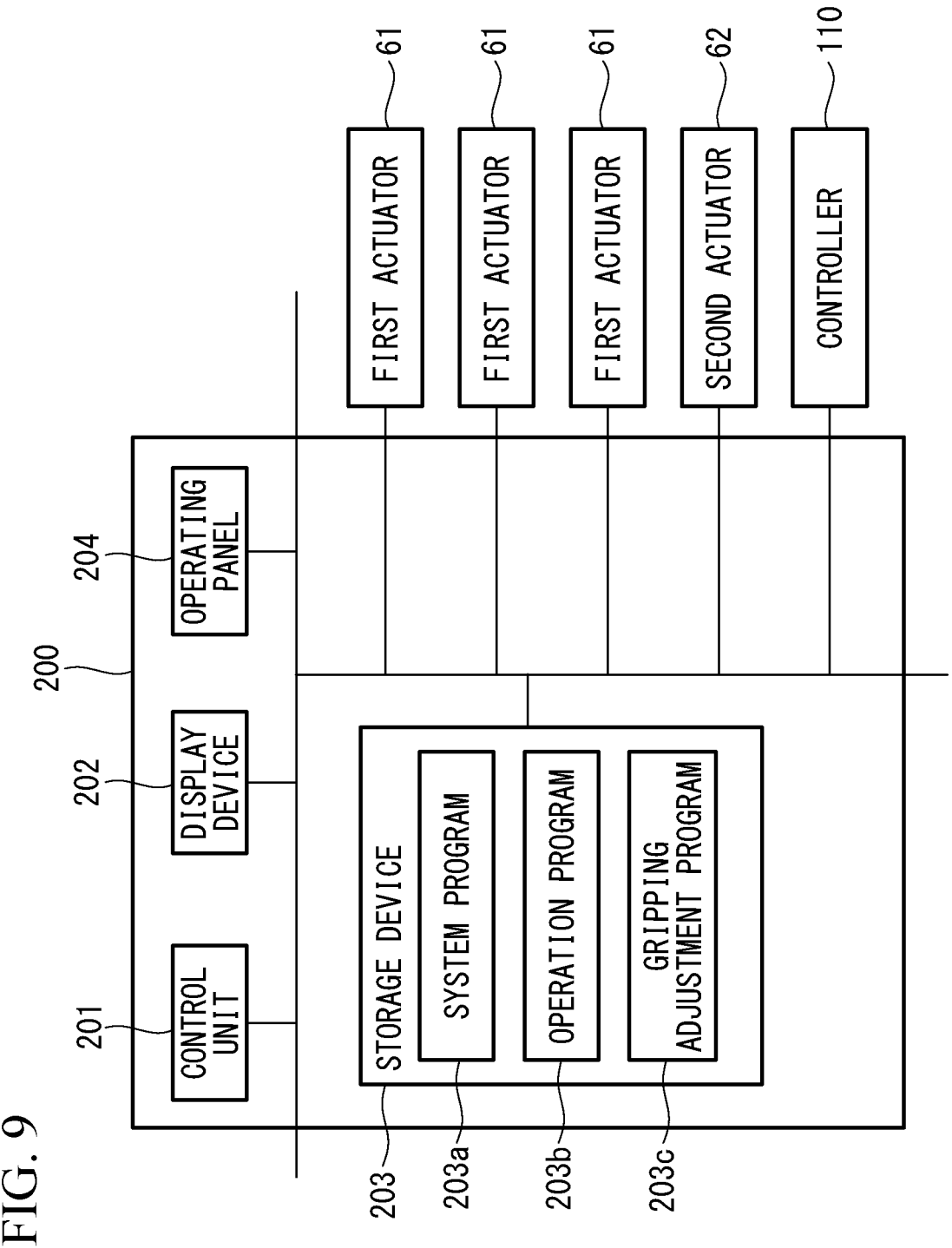
FIG. 9 is a block diagram of a control device of the hand according to the first embodiment.

This gripping hand includes a control device 200, and as shown in in FIG. 9, the control device 200 has: a control unit 201 having, for example, a CPU and a RAM; a display device 202; a storage device 203 having a nonvolatile storage, a ROM, etc.; and an operating panel 204 that is connected to the control device 200 and that is portable by an operator. The operating panel 204 may be configured to wirelessly communicate with the control device 200.

The control device 200 is connected to, and controls, the first actuators 61, the second actuator 62, and a controller 110 of the compressor 100. The compressor 100 can detect the pressure and the flow volume of a pressure control fluid supplied to and discharged from each of the flexible finger parts 22, and the detected pressure and the detected flow volume are transmitted to the control device 200 via the controller 110. This embodiment may be configured so that the pressure and the flow volume of a pressure control fluid supplied to and discharged from each of the flexible finger parts 22 are detected by sensors provided in the interior of the flexible finger part 22, the finger base member 21, etc., subsequently transmitting the detected pressure and the detected flow volume to the control device 200.

The basic operation of the gripping hand with the above-described configuration will be described below. In this case, finger arrangement data that associates the types of grasp objects W with the positions of the finger base members 21, in a direction intersecting the hand axial direction, and also that associates the types of the grasp objects W with the orientations of the finger base members 21, in the swivel direction, is stored in the storage device 203 of the control device 200.

Figure 5:
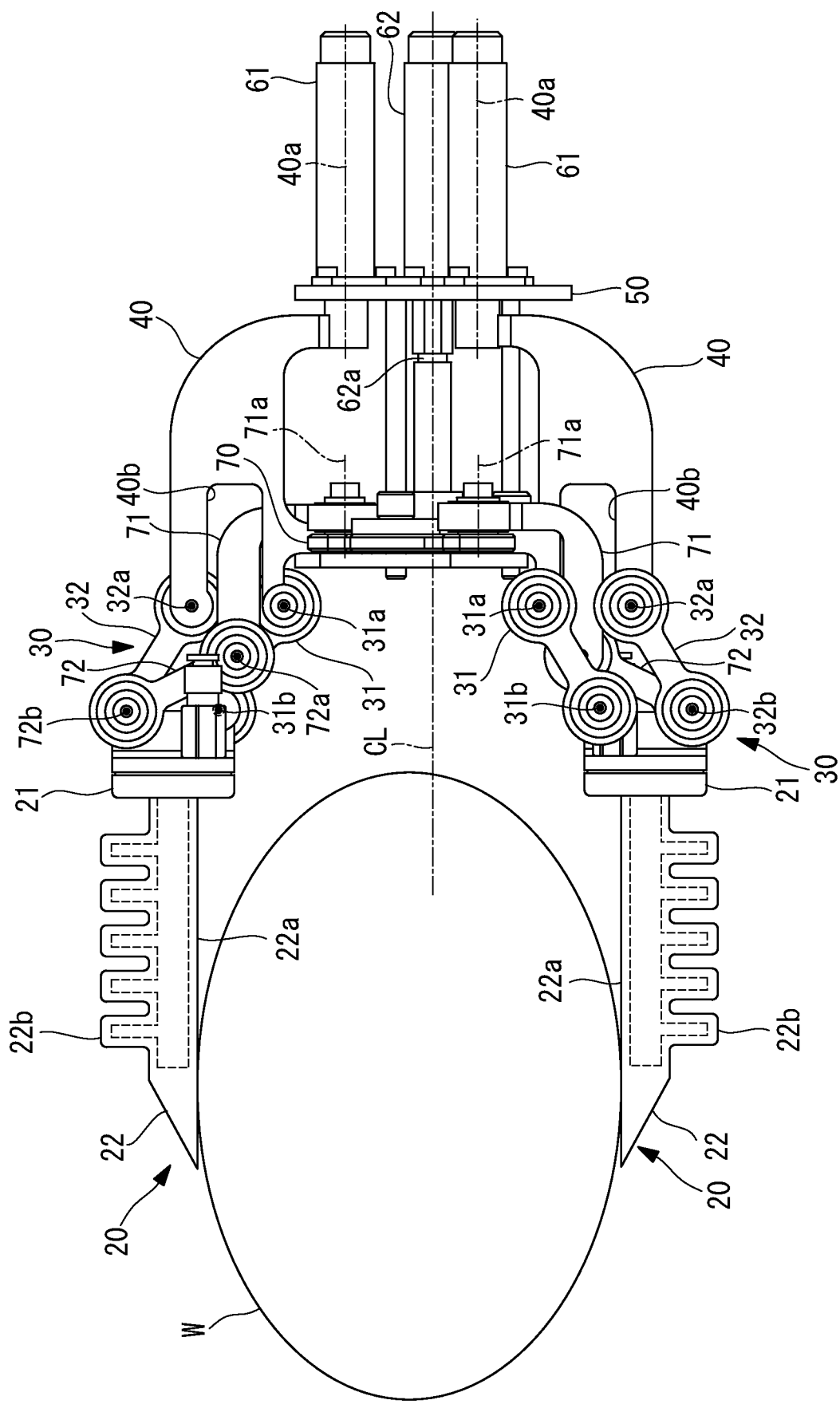
FIG. 5 is a diagram for illustrating an operation of the hand according to the first embodiment.

As shown in FIG. 5, when the operation of gripping a grasp object W with a large external size is started, the control unit 201 first receives information of the type of the grasp object W to be gripped and moves the axial-direction moving member 70 by means of the second actuator 62 towards the distal end sides of the flexible finger parts 22, namely, towards the distal end side of the hand, thereby moving the finger base members 21 of the fingers 20 outwardly in the hand radial direction (finger radial direction) to adjust the positions of the finger base members 21 before the gripping operation.

Subsequently, the control unit 201 moves the axial-direction moving member 70 by means of the second actuator 62 towards the base member 50 side, namely, towards the basal end side of the hand, thereby moving the finger base members 21 of the fingers 20 inwardly in the hand radial direction (finger radial direction), and then performs the gripping operation of supplying a pressure control fluid (compressed air) into each of the flexible finger parts 22 by means of the compressor 100.

As a result, the distal end sides of the flexible finger parts 22 deflect inwardly in the hand radial direction (finger radial direction), thereby causing the flexible finger parts 22 to grip the grasp object W. Note that it is possible to perform the gripping operation merely by supplying and discharging pressure control fluids by means of the compressor 100 to and from the interiors of the flexible finger parts 22, without moving the finger base members 21 by means of the second actuator 62 inwardly in the hand radial direction (finger radial direction).

Figure 6:
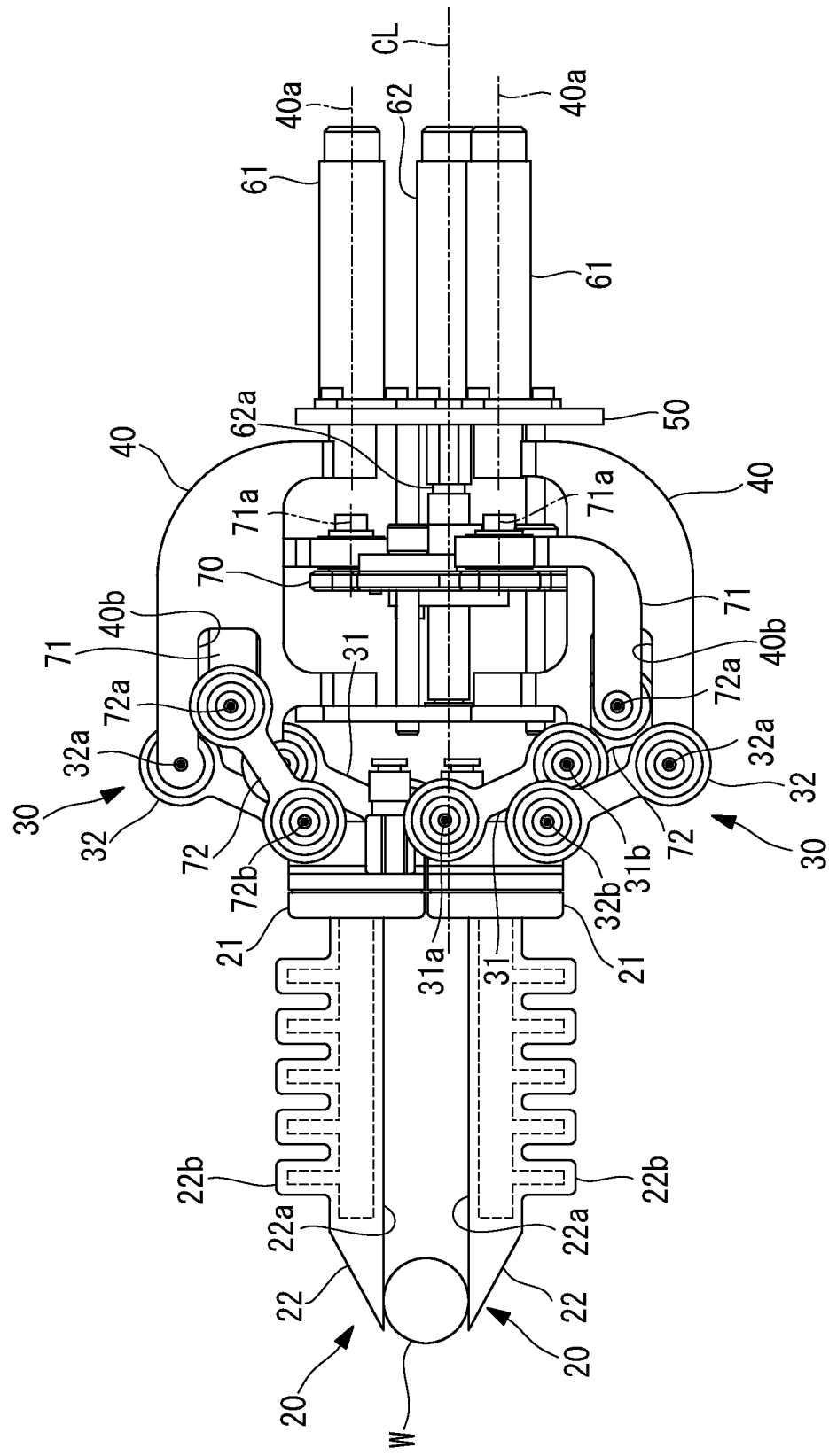
FIG. 6 is a diagram for illustrating an operation of the hand according to the first embodiment.

On the other hand, as shown in FIG. 6, when a grasp object W having a small external size is to be gripped, the control unit 201 first receives information of the type of the grasp object W to be gripped and moves the axial-direction moving member 70 by means of the second actuator 62 towards the base member 50, namely, towards the basal end side of the hand, thereby moving the finger base members 21 of the fingers 20 inwardly in the hand radial direction (finger radial direction) to adjust the positions of the finger base members 21 before the gripping operation. The gripping operation is performed in the same manner as with the grasp object W having a large external size.

Figure 7:
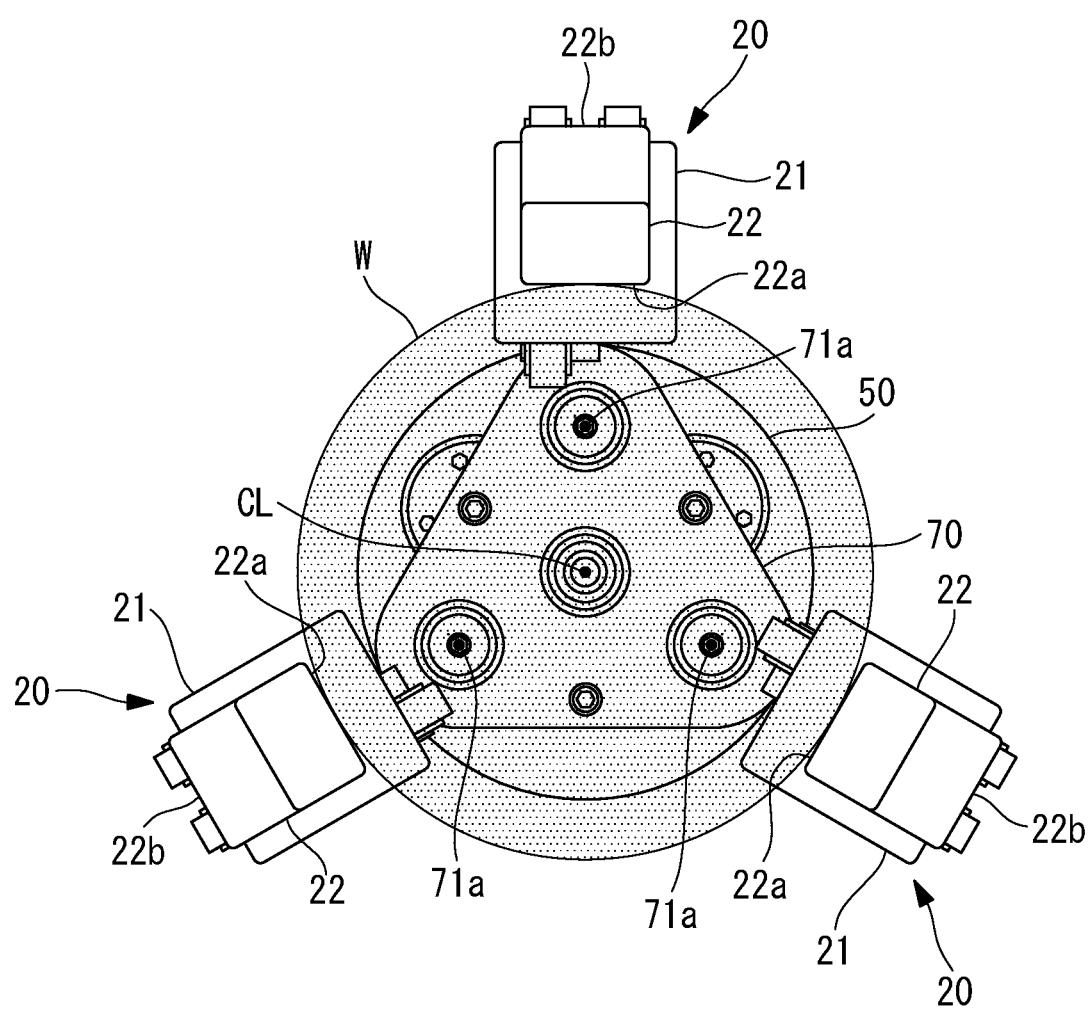
FIG. 7 is a diagram for illustrating an operation of the hand according to the first embodiment.

Also, as shown in FIG. 7, when, for example, a grasp object W that is circular as viewed in a direction along the hand central line CL is to be gripped, the control unit 201 first receives information of the type of the grasp object W to be gripped and then rotates the swiveling members 40 by means of the first actuators 61 so that the gripping walls 22a of the flexible finger parts 22 are oriented towards the hand central line CL side to adjust the orientations of the finger base members 21 before the gripping operation. By doing so, when the axial-direction moving member 70 is moved by means of the second actuator 62, the finger base members 21 move in the hand radial direction, and when pressure control fluids are supplied by means of the compressor 100, the distal end sides of the flexible finger parts 22 deflect inwardly in the hand radial direction. The gripping operation is performed in the same manner as with the grasp object W having a large external size.

Figure 8:
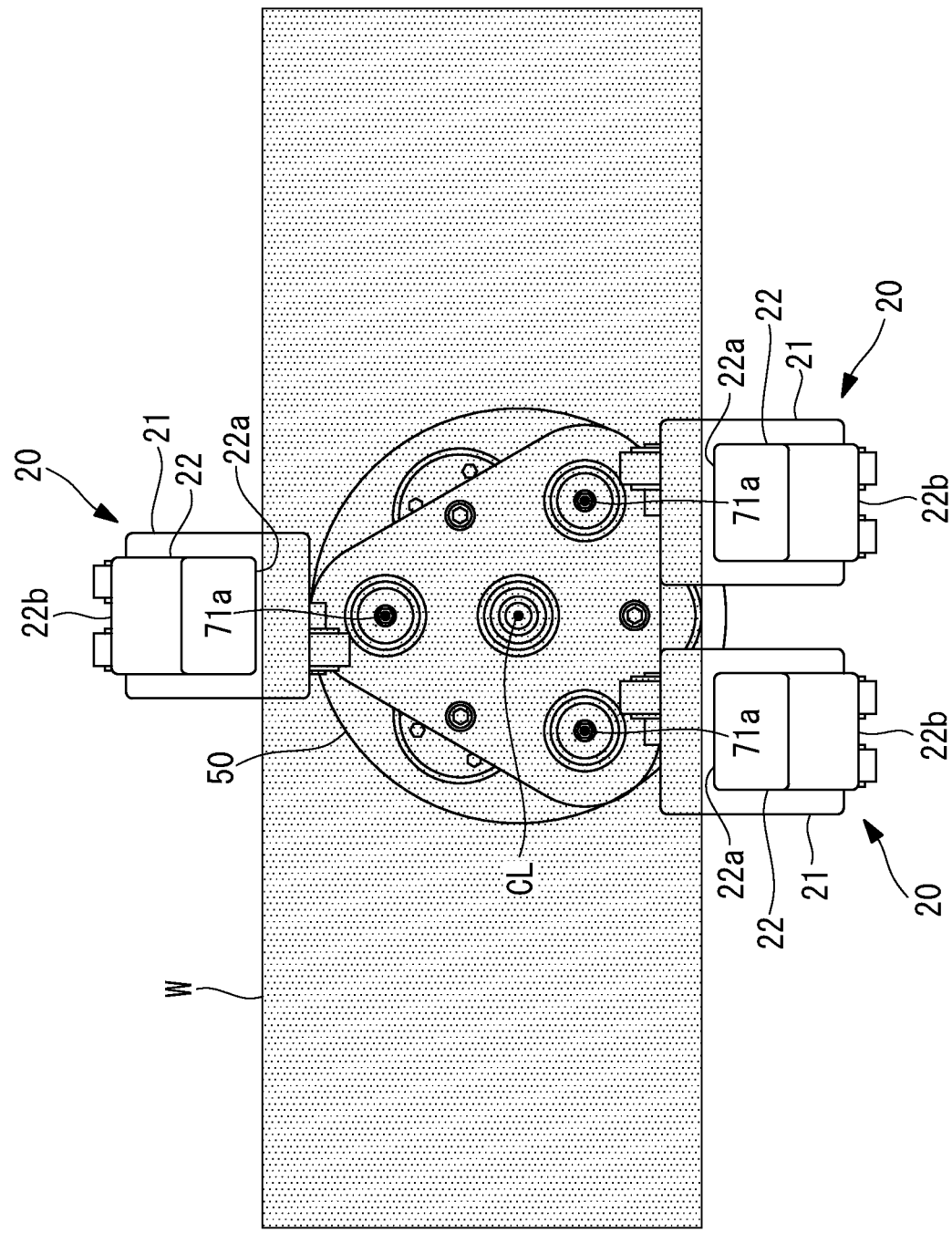
FIG. 8 is a diagram for illustrating an operation of the hand according to the first embodiment.

In addition, as shown in FIG. 8, when, for example, a grasp object W having longitudinal direction in a direction orthogonal to the hand central line CL is to be gripped, the control unit 201 first rotates the swiveling members 40 by means of the first actuators 61 so that the gripping wall(s) 22a of some (one in this embodiment) of the flexible finger parts 22 and the gripping wall(s) 22a of the rest (two in this embodiment) of the flexible finger parts 22 face in the opposite directions to each other to adjust the positions of the finger base members 21 before the gripping operation. In other words, the direction in which the first link member(s) 31 and the second link member(s) 32 of some (one in this embodiment) of the fingers 20 are arranged becomes parallel to the direction in which the first link member(s) 31 and the second link member(s) 32 of the rest (two in this embodiment) of the fingers 20 are arranged. In addition, the first link members 31 of the fingers 20 are disposed more inwardly in the hand radial direction than the second link members 32 thereof are. The gripping operation is performed in the same manner as with the grasp object W having a large external size.

The storage device 203 stores: a system program 203a in charge of basic functions for controlling the gripping hand; and an operation program 203b for performing predetermined tasks on a grasp object W with the gripping hand, such as a program 203b for a series of operations used to perform gripping and ungripping for transporting a grasp object W. In addition, the storage device 203 also stores a gripping adjustment program 203c for adjusting the gripping of a grasp object W.

For example, the control unit 201 is operated by the system program 203a, controls the first actuators 61, the second actuator 62, and the compressor 100 on the basis of the operation program 203b when performing a predetermined task on the grasp object W, and controls the first actuators 61, the second actuator 62, the compressor 100, etc. on the basis of the gripping adjustment program 203c when the fingers 20 come into contact with the grasp object W by means of the operation program 203b. In a case where the shapes and the gripping directions of grasp objects W are not constant, the above-described gripping adjustment is particularly effective. In the course of gripping adjustment, the gripping adjustment program 203c estimates or calculates a gripping position and a gripping force as described below.

While the grasp object W is being gripped by means of the flexible finger parts 22 of the fingers 20, the control device 200 receives the detected values of the rotational position sensors in the first actuators 61 and the second actuator 62, the detected values of the drive current sensors in the first actuators 61 and the second actuator 62 (torques applied to the actuators), the detected values of the pressure and the flow volume of the pressure control fluids supplied to and discharged from the flexible finger parts 22, etc. In addition, on the basis of these detected values, the control unit 201 of the control device 200: calculates or estimates a finger position including at least either the position and orientation of a finger base member 21 or the position and the orientation of a flexible finger part 22; estimates a gripping position, which is a position, area, etc. in which the grasp object W is gripped, in each of the flexible finger parts 22; calculates or estimates a gripping force for gripping the grasp object W by means of each of the flexible finger parts 22; etc. If the control unit 201 performs the above-described gripping adjustment so that the above-described positions and forces approach the respective target values thereof, this is advantageous in enhancing the gripping quality for gripping the grasp object W.

The above-described individual target values can be set on the basis of a database which is made by performing, in advance, gripping tests using a plurality of grasp objects W while varying at least one of the finger position, the gripping position, and the gripping force for producing the database on the basis of the results of this gripping test. In addition, models of the gripping hand and a plurality of grasp objects W may be produced in a simulation device, and simulation may be performed on the simulation device in the same manner as in the above-described test, thereby producing the above-described database on the basis of the results of the simulation. Furthermore, models of the gripping hand and grasp objects W may be produced in a simulation device, and the above-described detected values received by the control device 200 may be input to the simulation device, thereby estimating a gripping state and setting the above-described individual target values on the basis of this estimation.

In addition to the method for producing a database as described above, the above-described target values can be obtained in real time by performing physical simulation on the basis of models of the flexible finger parts 22 and a grasp object W while gripping the grasp object W, or alternatively, the above-described target values can also be obtained through deep learning etc. Whichever of an actual machine and a simulation device is used, a deep learning program can be made to learn, in advance as learning data, the detected values of the actuators 61 and 62 and the compressor 100 and information such as visual data or can be made to always perform learning during gripping. By doing so, the deep learning program can estimate target values on the basis of information of various types of detected values during gripping. By using deep learning, it is possible to handle, to a certain degree, even cases which are not completely aligned with data in the database.

Among the above-described finger positions, the positions and the orientations of the finger base members 21 can be calculated by the control device 200 on the basis of data etc. of a model of the gripping hand by using the detected values of the rotational position sensors of the first actuators 61 and the second actuator 62.

Among the above-described finger positions, the position and orientation of a predetermined longitudinal location (e.g., middle or distal end) of the gripping wall 22a of each of the flexible finger parts 22 in a state where the grasp object W is not gripped (no load state) can be calculated on the basis of a database obtained by conducting, in advance, a flexible finger test in which pressure control fluids are supplied or discharged at various pressures and amounts and then producing the database on the basis of the results of this flexible finger test.

Figure 10:
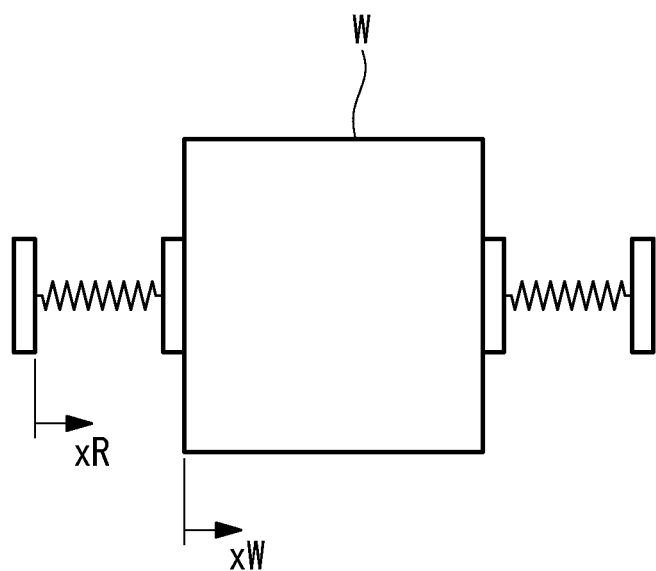
FIG. 10 is a diagram showing a gripping model performed by the hand.

First, a method for estimating or calculating the above-described gripping position will be described using a simple model shown in FIG. 10. Note that the simple model shown here is one example, and it is needless to say that other models can also be used. The gripping adjustment program 203c may be configured to estimate or calculate a gripping position and a gripping force as described below in the course of the above-described gripping adjustment. In FIG. 10, the position of the distal end of the gripping wall 22a of each of the flexible finger parts 22 in a state where no pressure control fluid is supplied is assumed as a neutral position xR. In one example, xR is the same position as the hand-radial-direction position of a prescribed portion of each of the finger base members 21. In addition, in a state where a fluid pressure P and a fluid flow volume Q are applied, the position of the distal end of the gripping wall 22a while no grasp object W is present is assumed as xR+L, and the position of the distal end of the gripping wall 22a while a grasp object W is present is assumed as a gripping position xW. L is obtained through a test etc. of the position and orientation of the gripping wall 22a in the above-described no load state.

For the sake of simplicity, assuming that the distal end of the gripping wall 22a of the flexible finger part 22 is pushed back by the grasp object W by a distance Δx when the grasp object W is gripped, Δx is obtained by Expression (1) below.

$$\Delta x = L - (xW - xR) \quad (1)$$

In addition, a spring constant K at the distal end of the gripping wall 22a of the flexible finger part 22 (physical property of the flexible finger part 22) is a function that varies with the fluid pressure P, the fluid flow volume Q, and Δx and is represented by Expression (2) below.

$$K = f(P, Q, \Delta x) \quad (2)$$

Therefore, a gripping force F is defined by the function represented by Expression (3) below.

$$F = K \cdot \Delta x = f(P, Q, \Delta x) \cdot \Delta x = f(P, Q, xR, xW) \quad (3)$$

The fluid pressure P, the fluid flow volume Q, and the neutral position xR are variables controlled by the control unit 201, and the gripping force F is calculated or estimated by the control unit 201. For this reason, the gripping position xW can be estimated with the function represented by Expression (4) below.

$$xW = f(P, Q, xR, F) \quad (4)$$

If the gripping adjustment program 203c is configured so that the control unit 201 estimates the gripping force F on the basis of the drive current in the actuators 61 and 62, the gripping force F can be estimated without providing additional sensors or etc., thus affording an advantage in achieving a small hand, reducing the manufacturing cost, etc.

Figure 11:
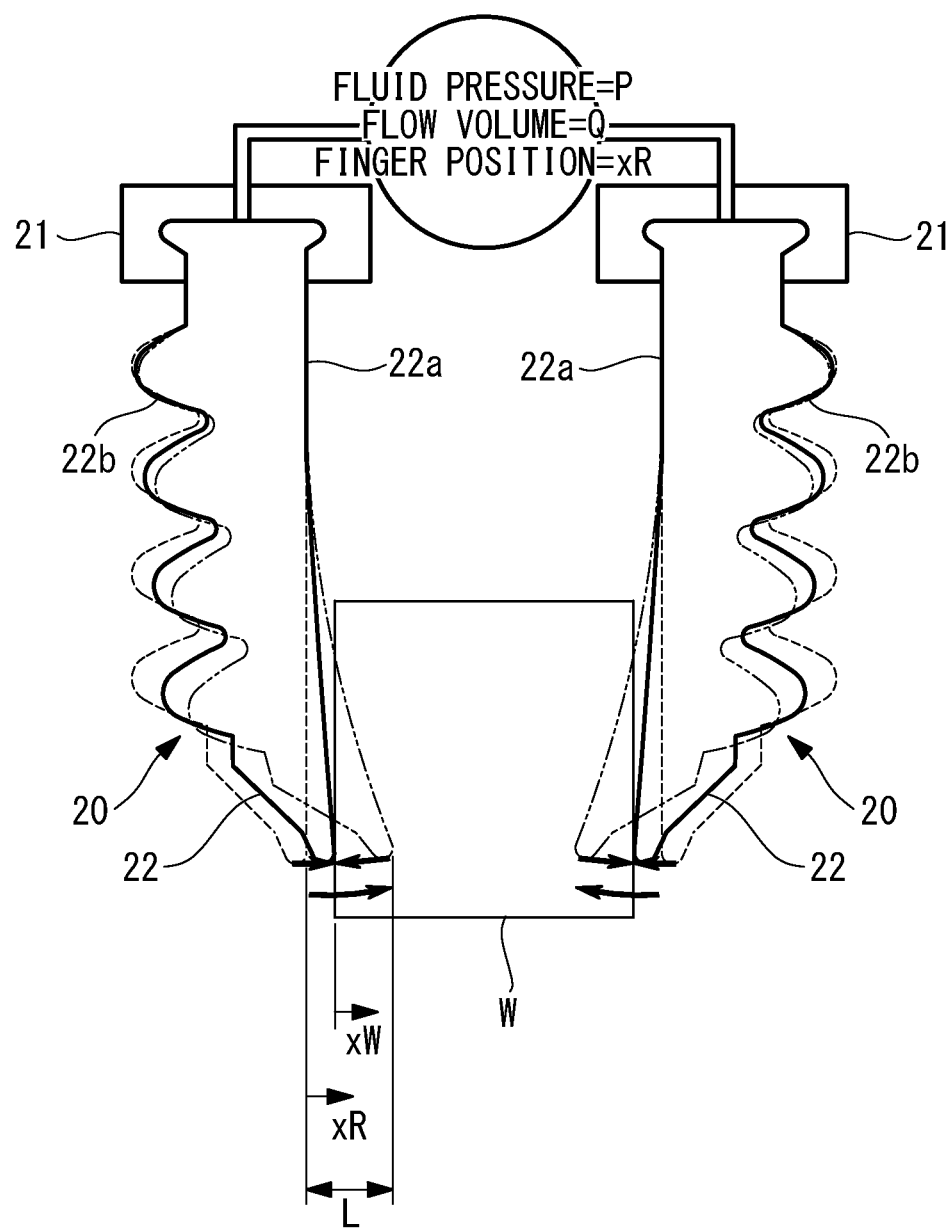
FIG. 11 is a diagram showing a gripping model of the hand according to the first embodiment.

The above-described model can also be applied to the fingers 20 facing each other, and when the model is to be applied to the gripping hand of this embodiment, it can be regarded as a model, as shown in FIG. 11, in which the grasp object W is gripped by the flexible finger parts 22 of the fingers 20 functioning as springs.

By changing the fluid pressure P and the fluid flow volume Q and also by changing the neutral position xR of each of the finger base members 21 by means of the actuators 61 and 62, the gripping position and the gripping force can be controlled by the control unit 201. For example, the gripping quality can be enhanced by controlling the gripping position and the gripping force through the modeling as described above.

The amount of deformation L of a flexible finger part 22 in response to the fluid pressure P and the fluid flow volume Q (the amount of deformation of the flexible finger part 22) as well as the spring constant K of the flexible finger part 22, vary depending on the shape and characteristics of the flexible finger part 22. For this reason, the above-described gripping position can be correctly estimated or calculated by pre-storing, in the storage device 203 for each type of the flexible finger parts 22, information about the correspondence relationship of the amount of deformation L and the spring constant K in response to the fluid pressure P and the fluid flow volume Q.

On the other hand, the gripping adjustment program 203c may be configured to detect, in the course of the above-described gripping adjustment, whether or not each of the flexible finger parts 22 is in partial abutment and to correct partial abutment, if any, as described below.

Figure 12A:
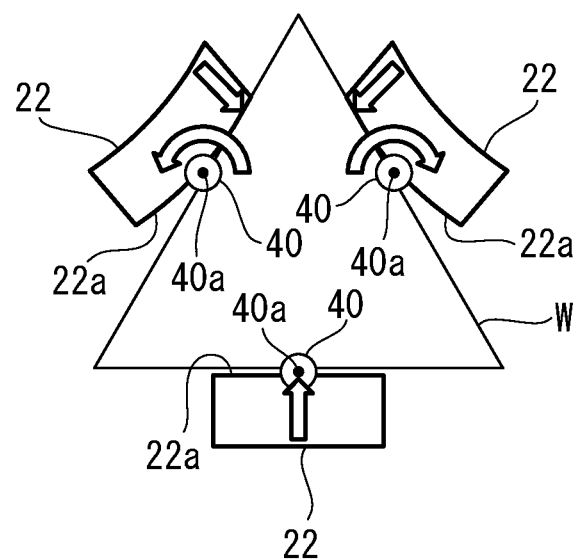
FIG. 12A is a diagram showing gripping states of the hand according to the first embodiment, and showing a state in which flexible finger parts are arranged at rotational positions at which the flexible finger parts do not face a grasp object.
Figure 13A:
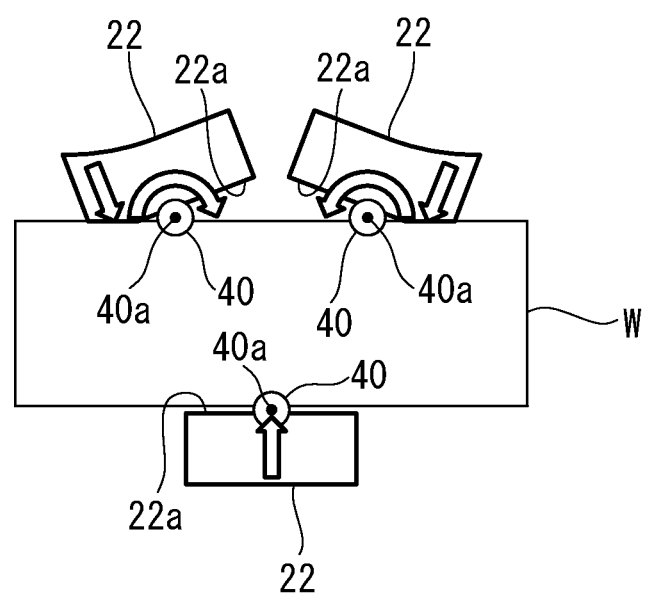
FIG. 13A is a diagram showing gripping states of the hand according to the first embodiment, and showing a state in which the flexible finger parts are arranged at rotational positions at which the flexible finger parts do not face a grasp object.

For example, when the gripping wall 22a of a flexible finger part 22 does not face the contact surface of the grasp object W as shown in FIGS. 12(a) and 13(a), that flexible finger part 22 is in partial abutment with the contact surface. Then, when gripping is performed in this state, a rotational reaction force about the swiveling axis 40a occurs in the swiveling member 40, and therefore, this rotational reaction force can be detected by the control unit 201 on the basis of the drive current of the first actuator 61. Note that a torque sensor for detecting a rotational reaction force about each of the swiveling axes 40a may be provided separately.

Figure 12B:
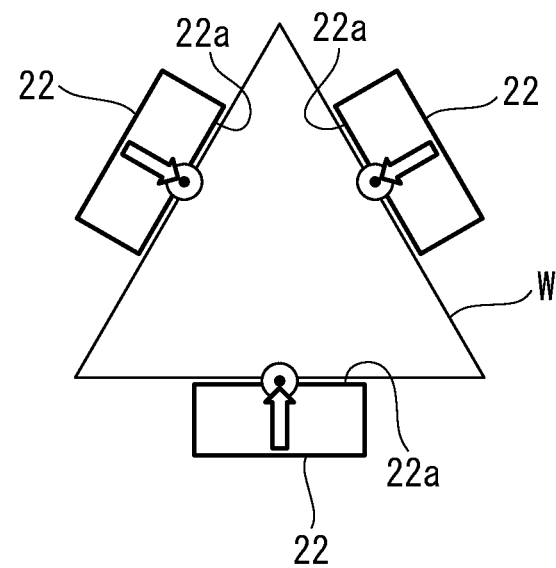
FIG. 12B is a diagram showing gripping states of the hand according to the first embodiment, and showing a state in which the flexible finger parts are arranged at rotational positions at which the flexible finger parts face the grasp object.
Figure 13B:
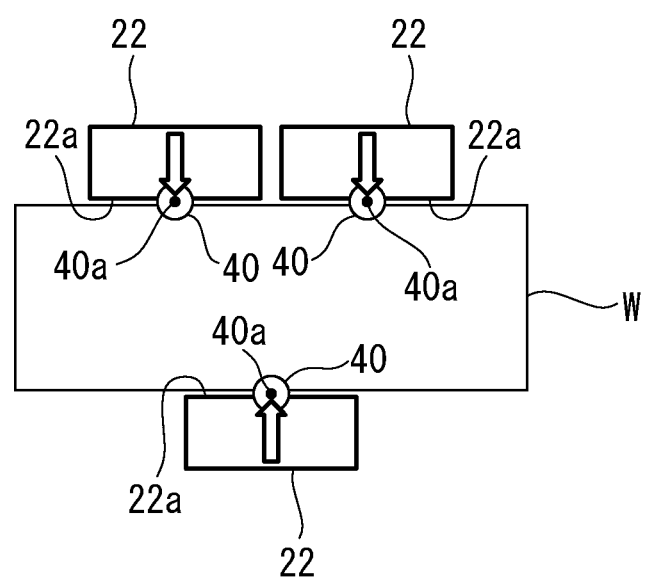
FIG. 13B is a diagram showing gripping states of the hand according to the first embodiment, and showing a state in which the flexible finger parts are arranged at rotational positions at which the flexible finger parts face the grasp object.

If the rotational reaction force about the swiveling axis 40a is large, such as in a case where the rotational reaction force exceeds a prescribed value, it is understood that the flexible finger part 22 is in a state where it cannot apply a force in a suitable direction, and hence, the control unit 201 controls the corresponding first actuator 61 on the basis of the gripping adjustment program 203c so as to correct the situation. For example, control is performed so as to achieve a transition from the state in FIG. 12(a) to the state in FIG. 12(b), and control is performed so as to achieve a transition from the state in FIG. 13(a) to the state in FIG. 13(b).

In addition, besides the case of the above-described partial abutment, the gripping adjustment program 203c may be configured so that when the flexible finger parts 22 come into contact with a contacted member, the gripping adjustment program 203c detects that contact and controls the first actuators 61, the second actuator 62, the compressor 100, etc. according to the detection results.

In the same manner as when detecting, on the basis of the drive current of a first actuator 61, the rotational reaction force about the swiveling axis 40a exerted on the flexible finger part 22, the control unit 201 can detect, on the basis of the drive current of the second actuator 62, a reaction force in the hand axial direction (reaction force in the axial direction) exerted on the flexible finger parts 22. Note that each of the fingers 20 can be provided with a force sensor for detecting a reaction force in the axial direction exerted on the flexible finger part 22.

Figure 14A:
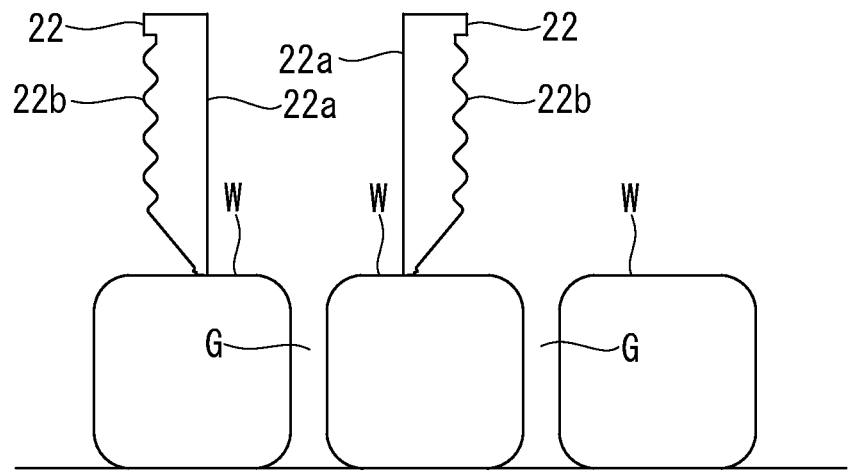
FIG. 14A is a diagram illustrating an operation of the hand according to the first embodiment, and showing a state in which the flexible finger parts are in contact with the upper ends of grasp objects.
Figure 14B:
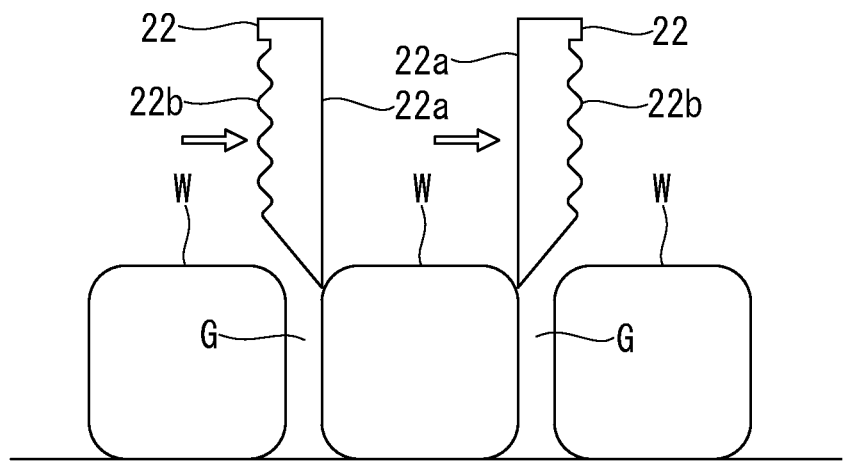
FIG. 14B is a diagram illustrating an operation of the hand according to the first embodiment, and showing a state in which the flexible finger parts have moved to gap positions.
Figure 14C:
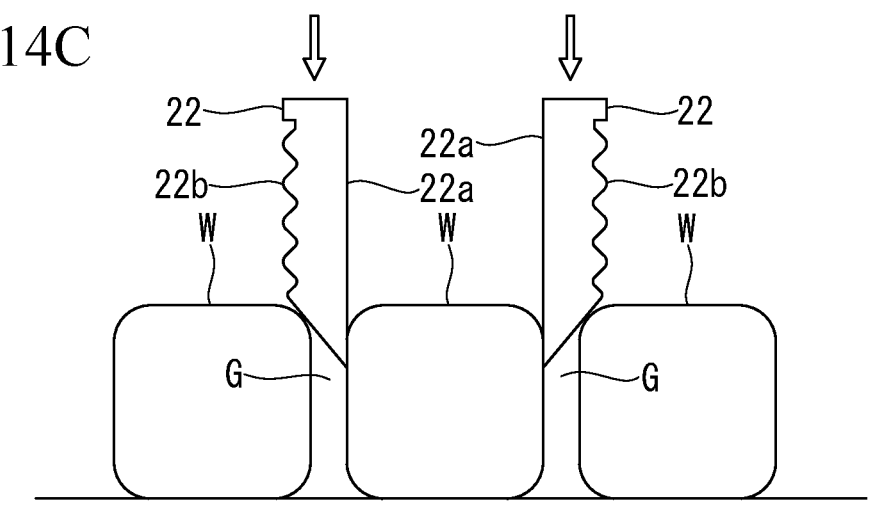
FIG. 14C is a diagram illustrating an operation of the hand according to the first embodiment, and showing a state in which the flexible finger parts have moved to the gripping positions.

For example, as shown in FIG. 14(c), when a grasp object W is to be gripped by inserting flexible finger parts 22 into gaps G between a plurality of grasp objects W arranged in a prescribed direction, the control unit 201 can detect the reaction force in the axial direction exerted on the flexible finger parts 22 and thereby can estimate the states of the flexible finger parts 22 with respect to the grasp objects W.

For example, while moving each of the flexible finger parts 22 to a predetermined position in the hand axial direction towards a grasp object W to grip the grasp object W, if the distal end of each of the flexible finger parts 22 comes into contact with a grasp object W in the hand axial direction as shown in FIG. 14(a), that contact is detected by the control unit 201 as a reaction force in the axial direction. At this time, the control unit 201 controls the actuators 61 and 62 on the basis of the gripping adjustment program 203c or sends a command to the control device of the robot on which the gripping hand is mounted.

By doing so, the flexible finger parts 22 move in the hand radial direction (direction intersecting the hand central line CL) relative to the grasp objects W. At this time, the distal ends of the flexible finger parts 22 move so as to slide on the upper surfaces of the grasp objects W. Then, when the distal ends of the flexible finger parts 22 reach the gaps G between the grasp objects W, the distal ends of the flexible finger parts 22 enter the gaps G as shown in FIG. 14(b), and at this time, the control unit 201 detects that the reaction force of each of the flexible finger parts 22 in the axial direction has become small (change in the reaction force in the axial direction).

Because the flexible finger parts 22 have flexibility, a relative positional relationship between each of the flexible finger parts 22 and the grasp object W can be estimated by bringing the flexible finger parts 22 into contact with the grasp object W as described above to slightly deform the flexible finger parts 22, moving, in this state, the flexible finger parts 22 relative to the grasp object W, and then detecting changes in the reaction force in the axial direction at that time.

When each of the flexible finger parts 22 can be made to slide into a gap between a plurality of grasp objects W as described above by using the flexibility of the flexible finger part 22, it is possible to facilitate the operation of gripping a plurality of grasp objects W stacked manually, the operation of taking out a plurality of grasp objects W arranged in a dense manner, etc.

Figure 15:
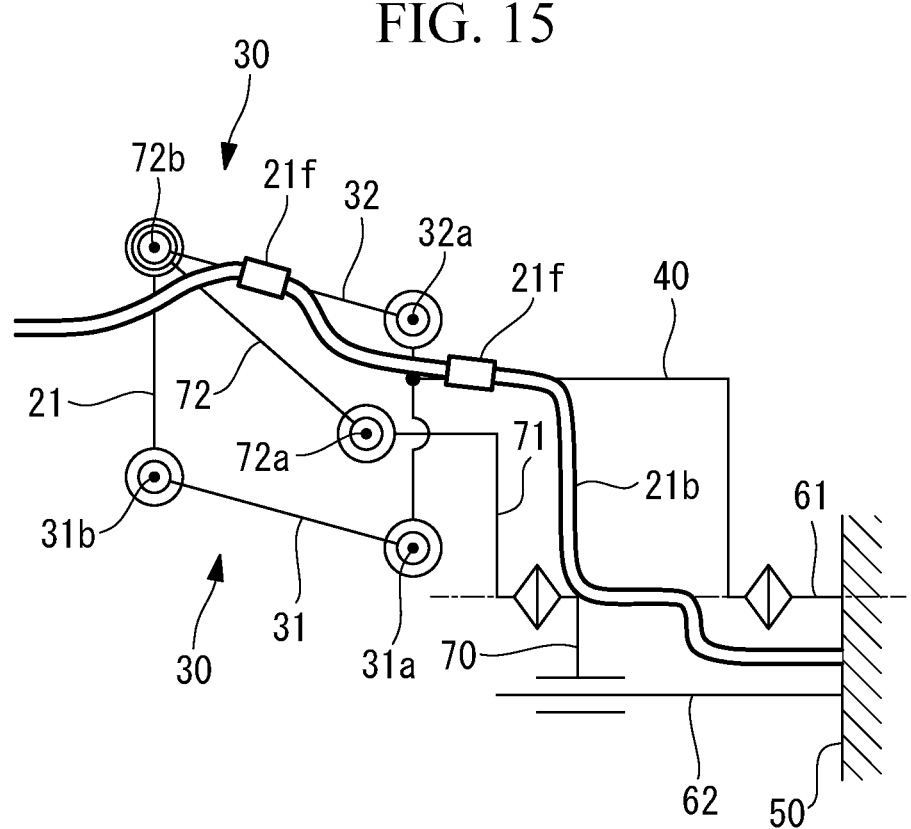
FIG. 15 is a model diagram showing an example of tubing for the hand according to the first embodiment.

Note that, as one example in this embodiment, each of the tubes 21b in FIG. 4 for supplying and discharging a pressure control fluid to and from the corresponding flexible finger part 22 can be arranged as shown in FIG. 15. More specifically, the tube 21b extending from the finger base member 21 can be arranged so as to extend along the second link member 32 and the swiveling member 40 and to reach the base member 50. To make the tube 21b run along the second link member 32 and the swiveling member 40, the second link member 32 and the swiveling member 40 can be made to hold the tube 21b by means of a tube support member 21f.

With this configuration, because at least a portion of the tube 21b between the section along the swiveling member 40 and the base member 50 extends in the hand axial direction and is also disposed in the vicinity of the swiveling axis 40a, the tube 21b does not interfere when a movable section of the gripping hand is driven, thus preventing the tube 21b from being damaged, coming off, etc.

Figure 16:
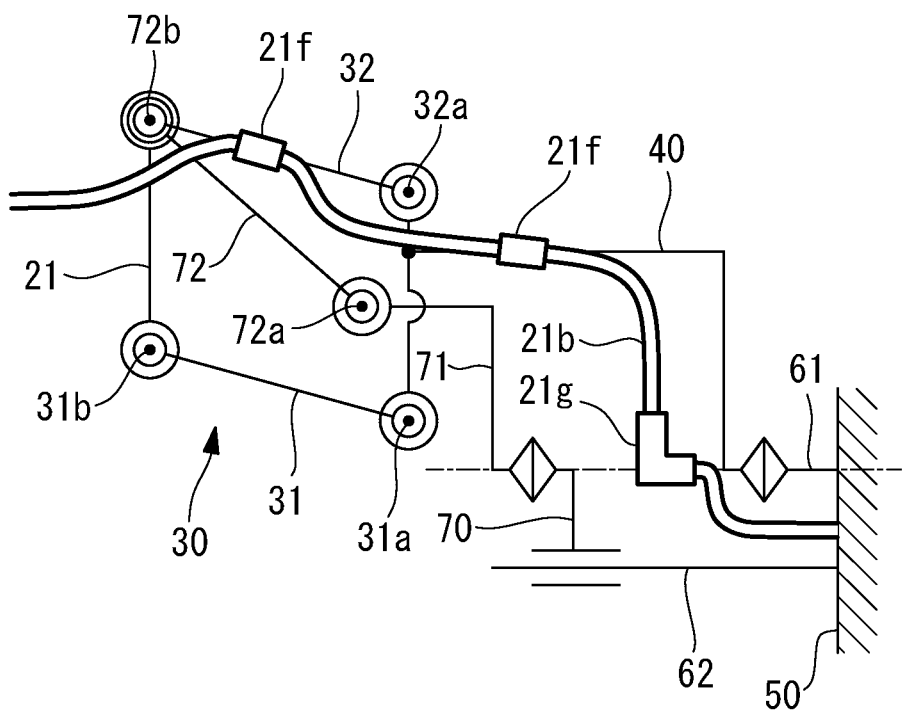
FIG. 16 is a model diagram showing another example of tubing for the hand according to the first embodiment.

Furthermore, as shown in FIG. 16, a portion of the tube 21b between the section along the swiveling member 40 and the base member 50 may be formed of a rotary joint 21g. In this case, a stationary section of the rotary joint 21g is fixed in the vicinity of the swiveling axis 40a so as to extend in the hand axial direction. In addition, a movable section of the rotary joint 21g can be swung about an axis line along the swiveling axis 40a relative to the above-described stationary section. Then, the movable section is connected to the tube on the flexible finger part 22 side, and the stationary section is connected to the tube on the compressor 100 side.

With this configuration, when the swiveling member 40 is swiveled and the parallel link 30 is driven, it is possible to more effectively prevent the tubes 21b from experiencing an unintended pulling force and also the tubes 21b from being swung, thus affording an advantage in preventing the tube 21b from being damaged, coming off, etc.

A gripping hand according to a second embodiment of the present invention will be described below with reference to the drawings. The second embodiment differs from the first embodiment in that the single axial-direction moving member 70 and the single second actuator 62 are provided in the first embodiment, whereas the plurality of fingers 20 include respective axial-direction moving members 80 and respective second actuators 63 in the second embodiment. The same components in the second embodiment as those used in the first embodiment are denoted by the same reference signs, and thus descriptions thereof will be omitted.

Figure 17:
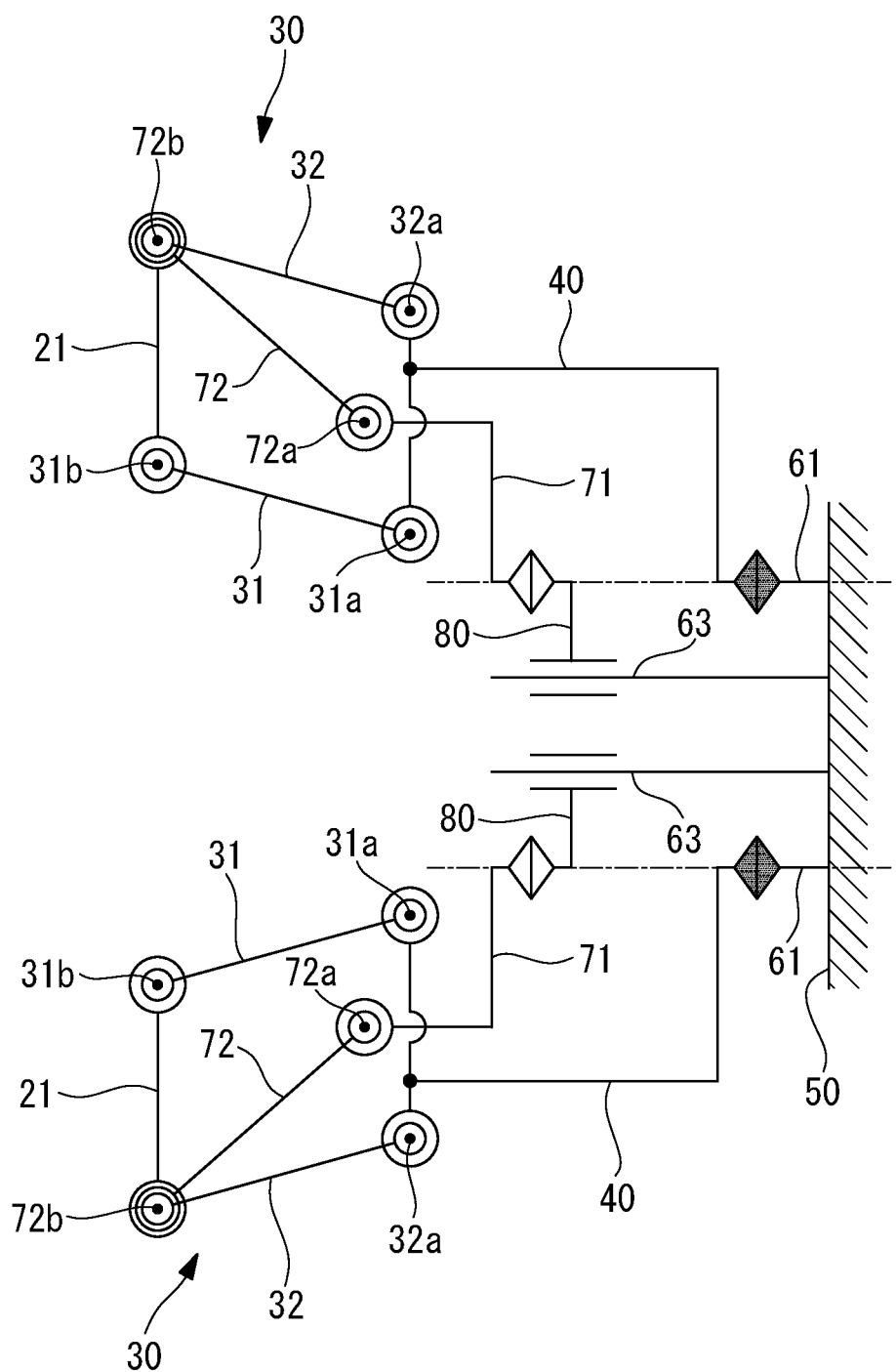
FIG. 17 is a model diagram of a hand according to a second embodiment of the present invention.

As shown in FIG. 17, in the gripping hand of the second embodiment, the plurality of fingers 20 include the respective second actuators 63, and the plurality of fingers 20 include the respective axial-direction moving members 80. The plurality of axial-direction moving members 80 are configured to move in the hand axial direction by means of the respective second actuators 63. The second actuators 63 are mounted on the base member 50, and the output shafts of the second actuators 63 are engaged with the respective axial-direction moving members 80 with threaded portions, such as trapezoidal screws or ball screws, interposed therebetween. Each of the second actuators 63 includes a rotational position sensor, such as an encoder, for detecting the rotational position of the output shaft thereof and also includes a drive current sensor for detecting the drive current thereof.

With the above-described configuration, when the output shafts of the second actuators 63 are rotated, the axial-direction moving members 80 can be moved in a direction along the hand central line CL (hand axial direction).

Although one end of each of the plurality of first drive link members 71 is supported on the axial-direction moving member 70 in the first embodiment, one end of each of the plurality of first drive link members 71 is supported on the corresponding axial-direction moving member 80 in the second embodiment.

Due to this configuration, the parallel links 30 can be moved separately by the respective second actuators 63 in the second embodiment, though all the parallel links 30 are moved simultaneously when the second actuator 62 is driven in the first embodiment. In short, the hand-radial-direction positions of the finger base members 21 of the plurality of fingers 20 can be adjusted independently.

In this manner, because the hand-radial-direction positions of the finger base members 21 of the plurality of fingers 20 can be adjusted individually, a suitable gripping state of each of the flexible finger parts 22 can be realized for various grasp objects W. In addition, the positions of the finger base members 21 of the plurality of fingers 20 in a direction intersecting the hand axial direction can also be adjusted independently of one another while the flexible finger parts 22 are gripping a grasp object W. This is helpful in changing (In-Hand manipulation), in easy and various manners, the orientation of the grasp object W relative to the gripping hand while gripping the grasp object W.

Figure 18:
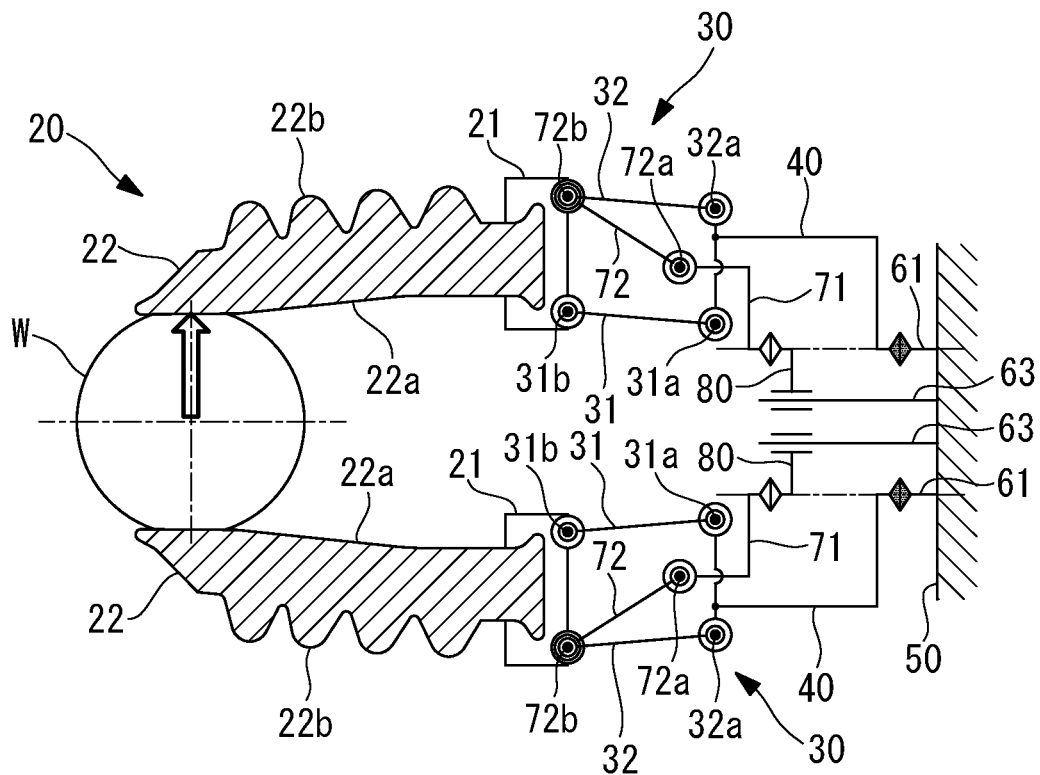
FIG. 18 is a diagram for illustrating an operation of the hand according to the second embodiment.
Figure 19:
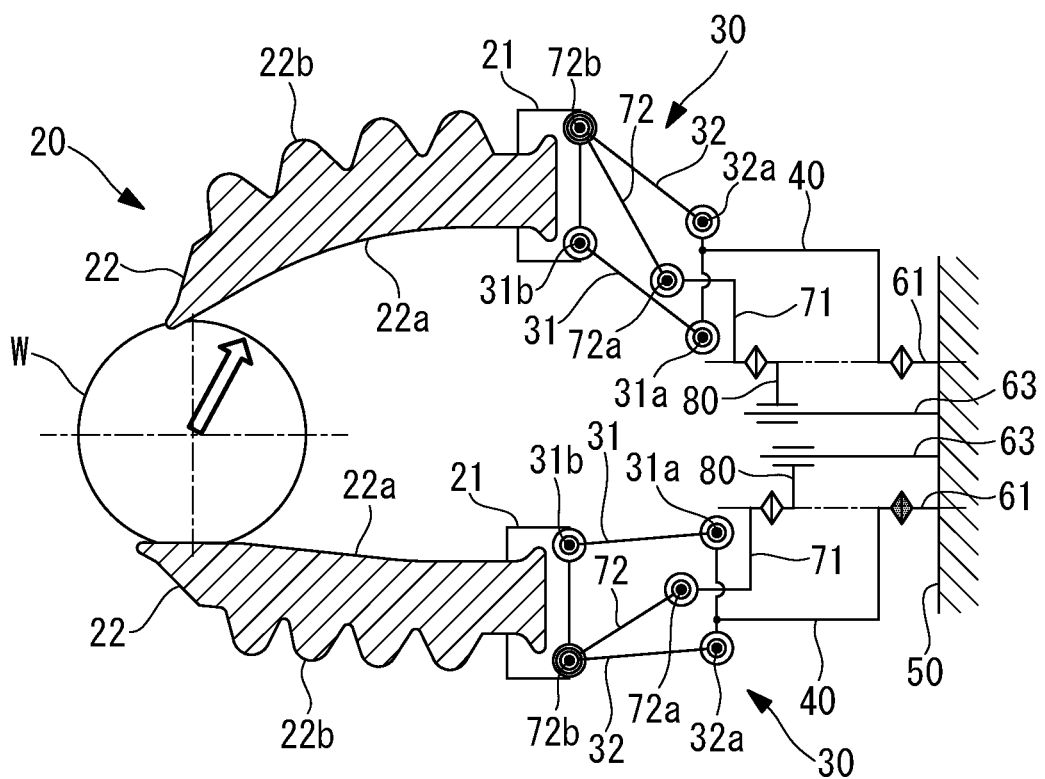
FIG. 19 is a diagram for illustrating an operation of the hand according to the second embodiment.

For example, by moving the positions of at least some of the plurality of finger base members 21 in a direction intersecting the hand axial direction as shown in FIG. 19 while the grasp object W is supported as shown in FIG. 18, the position at which each of the flexible finger parts 22 is in contact with the grasp object W changes, causing the grasp object W to rotate.

Figure 20:
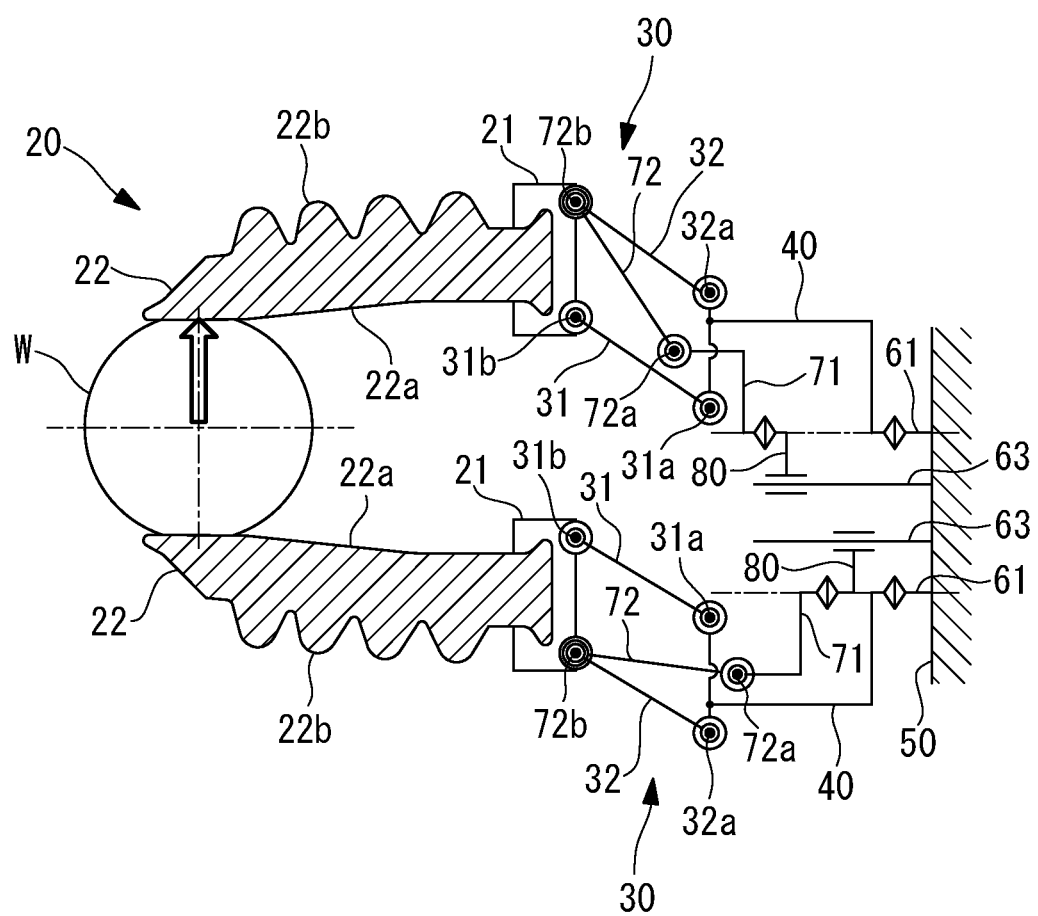
FIG. 20 is a diagram for illustrating an operation of the hand according to the second embodiment.

On the other hand, by moving the positions of the plurality of finger base members 21 in the same direction intersecting the hand axial direction as shown in FIG. 20 while the grasp object W is supported as shown in FIG. 18, the hand-radial-direction position of the grasp object W relative to the base member 50 can be changed.

In addition, in a state where the grasp object W is gripped by means of the flexible finger parts 22 of the plurality of fingers 20, it is possible to, for example, arrange the flexible finger parts 22 of a pair of fingers 20 by means of the respective first actuators 61 so as to face each other and also to retract the other finger 20 from the grasp object W. This is helpful in re-gripping, in easy and various manners, the grasp object W (changing the orientation of the grasp object W relative to the gripping hand) by means of the plurality of fingers 20.

In the first embodiment and the second embodiment, it is also possible to mount the second actuators 62 and 63 on the swiveling members 40.

Figure 21:
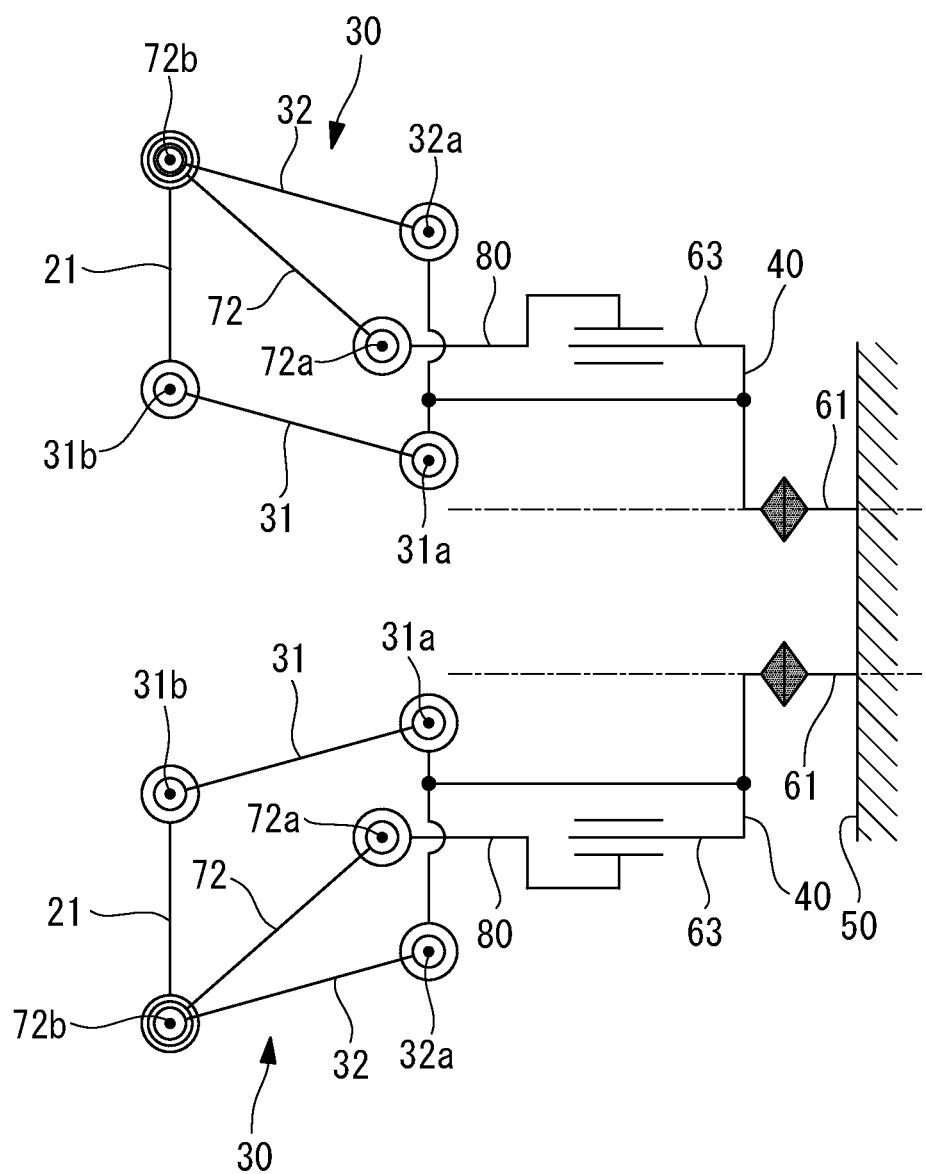
FIG. 21 is a model diagram showing a first modification of the hand according to the second embodiment.

For example, in the second embodiment, each of the second actuators 63 can be mounted on the corresponding swiveling member 40, as shown in FIG. 21. In this case, the first drive link members 71 are omitted, and one end of each of the second drive link members 72 is connected to the corresponding axial-direction moving member 80 so as to be swingable about the swing axis 72a. Mounting the second actuators 63 on the swiveling members 40 in this manner leads to a reduction in the number of components, a simplified structure, a high degree of freedom of design, etc.

Figure 22:
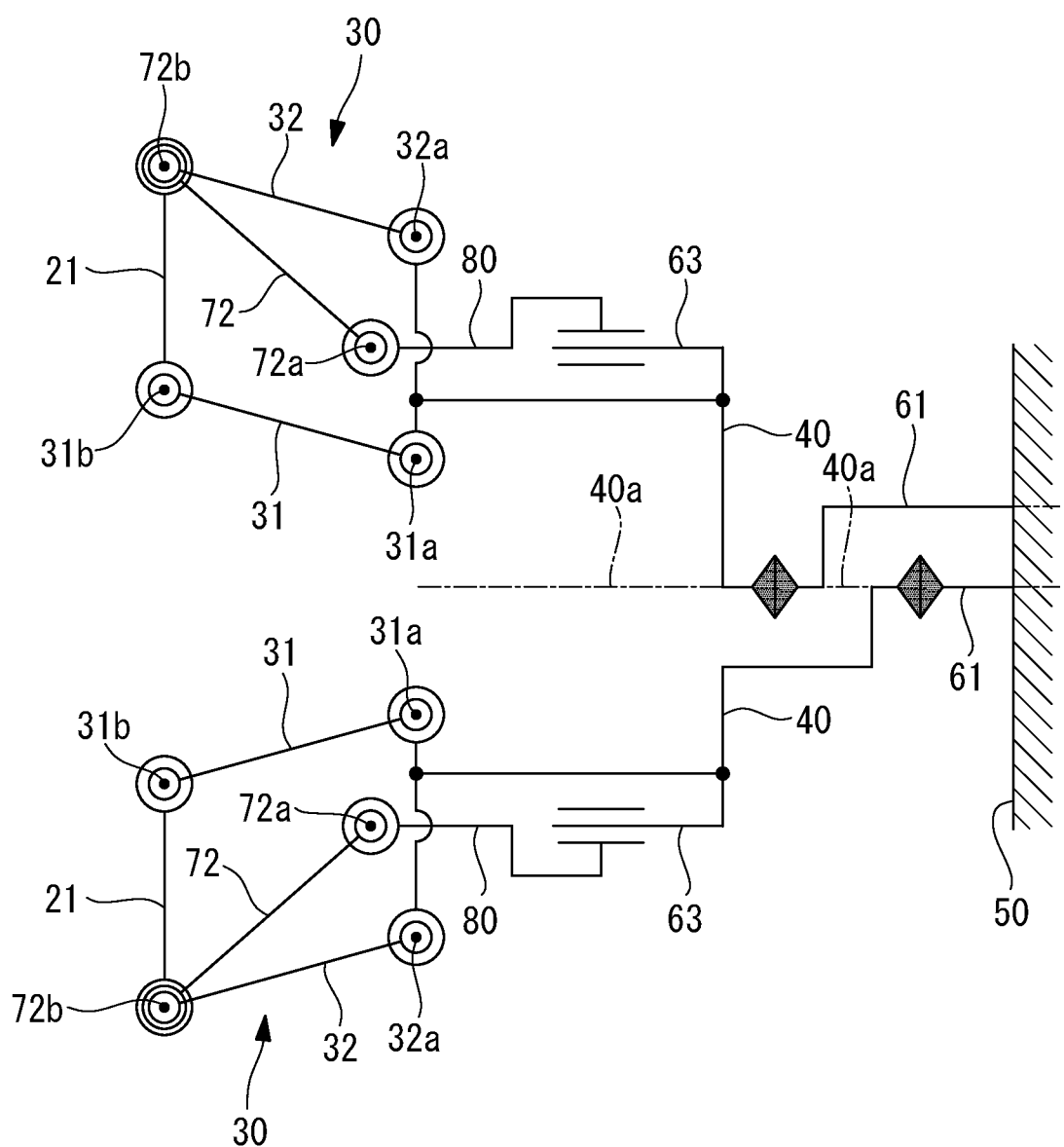
FIG. 22 is a model diagram showing a second modification of the hand according to the second embodiment.

In addition, as shown in FIG. 22, it is also possible to coaxially arrange the swiveling axes 40a of the plurality of swiveling members 40. In this case, singular points of the swiveling axes 40a are unified at one point. This is advantageous in the case of gripping a grasp object W that can be gripped more easily when singular points of the swiveling axes 40a are unified.

In addition, instead of the first drive link members 71 and the second drive link members 72, the first embodiment, the second embodiment, and the above-described modifications can include: an urging mechanism for urging the finger base member 21 of each of the fingers 20 in a predetermined direction; and a drive link member for moving the finger base member 21 while resisting the urging force applied by the urging mechanism.

Figure 23:
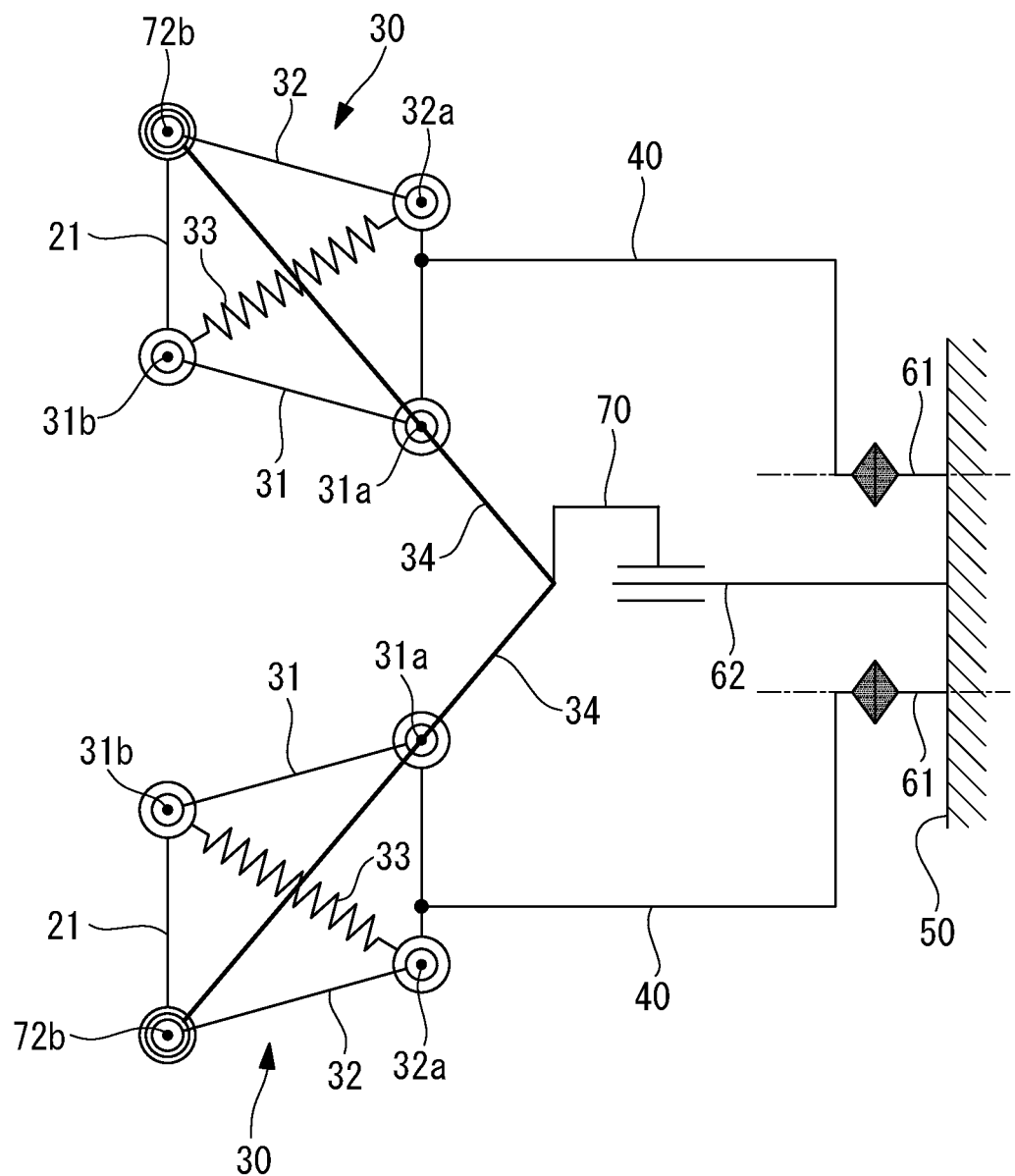
FIG. 23 is a model diagram showing a first modification of the hand according to the first embodiment.

For example, FIG. 23 shows an example in which the above-described urging mechanism and the above-described drive link member are provided in the first embodiment. As shown in FIG. 23, each of the parallel links 30 includes, as the urging mechanism, an urging member 33, such as a coil spring, for connecting the first link member 31 and the second link member 32. One end of the urging member 33 is connected to the other end side of the first link member 31, and the other end of the urging member 33 is connected to one end side of the second link member 32. In addition, the urging member 33 urges in a direction in which the other end side of the first link member 31 and one end side of the second link member 32 approach each other.

Each of the parallel links 30 is urged by the urging member 33 so that the other end side of the first link member 31 and one end side of the second link member 32 approach each other, causing the finger base member 21 to move outwardly in the hand radial direction.

On the other hand, as shown in FIG. 23, one end of a wire (drive link member) 34 is connected to the finger base member 21, the other end side of the first link member 31, or the other end side of the second link member 32 in each of the parallel links 30. The other end of the wire 34 is connected to the axial-direction moving member 70. In this case, any member that can transmit a pull force is employable as the drive link member. A member that elastically deforms in the longitudinal direction is also employable, and a rod that does not have flexibility, like the wire 34, is employable.

With the above-described configuration, the position of each of the finger base members 21 can be changed by moving the axial-direction moving member 70 by means of the second actuator 62. Because this configuration allows the movement of each of the finger base members 21 while omitting the first drive link members 71 and the second drive link members 72, it is helpful in saving the space, simplifying the structure, enhancing the degree of freedom of design, etc.

Note that the urging member 33 may be a member that generates an urging force for separating the other end side of the first link member 31 and one end side of the second link member 32 from each other. In this case, each of the finger base members 21 can be moved by using a rod instead of the wire 34.

In addition, the urging member 33 may be a member that connects one end side of the first link member 31 and the other end side of the second link member 32.

Note that when the above-described urging member 33 and the wire 34 are provided in the second embodiment, the urging member 33 is provided as described above, and the other end of the wire 34 is connected to the corresponding axial-direction moving member 80.

Figure 24:
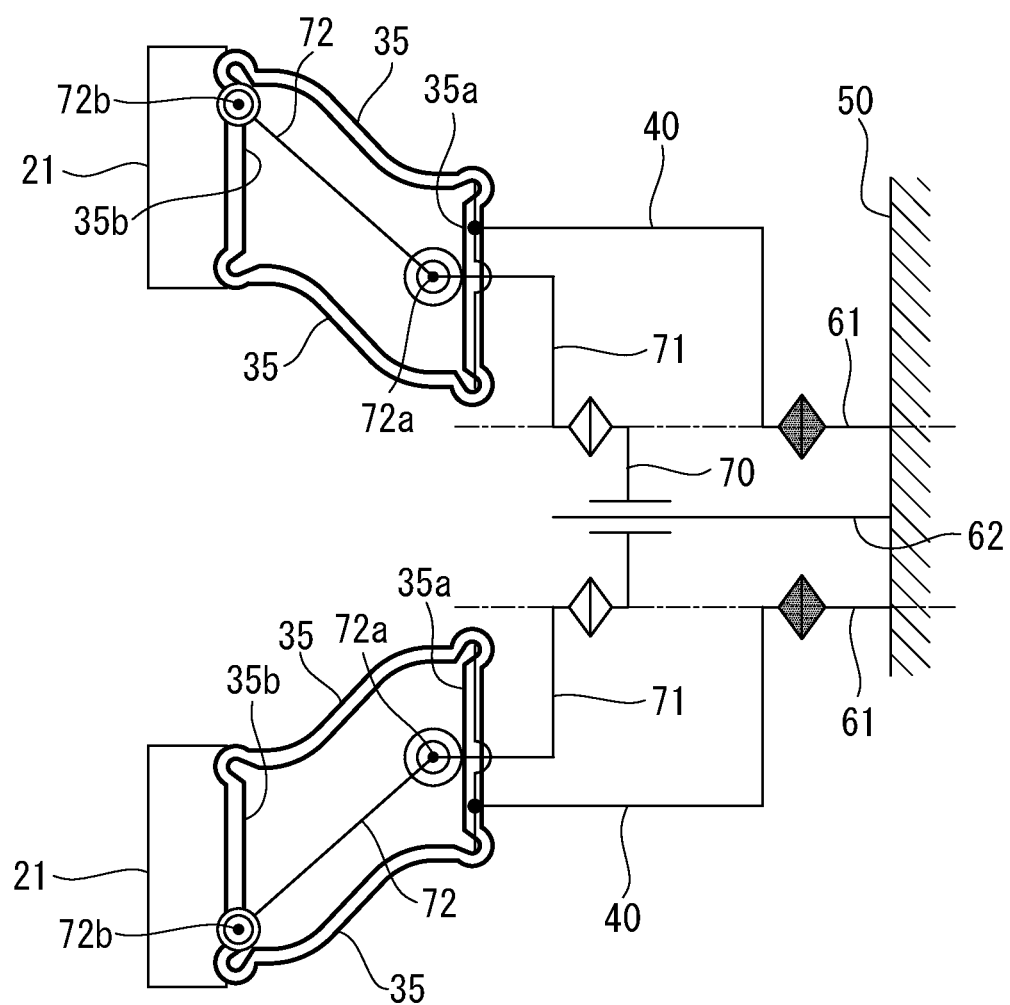
FIG. 24 is a model diagram showing a second modification of the hand according to the first embodiment.

In addition, in the first embodiment, the second embodiment, and the above-described various modifications, each of the finger base members 21 can also be connected to the other end of the corresponding swiveling member 40 via a plurality of flexible members 35, as shown in FIG. 24, instead of the first link member 31 and the second link member 32. In this case, when each of the swiveling members 40 is disposed at a predetermined swiveling position, the plurality of flexible members 35 are arranged in in the hand radial direction.

Each of the flexible members 35 is formed of an elongated member formed of, for example, plastic, metal, or the like. Each of the flexible members 35 is supported on the finger base member 21 and on the other end of the swiveling member 40 such that one end of the flexible member 35 is fixed to the other end of the corresponding swiveling member 40 or to a member fixed thereto and such that the other end of the flexible member 35 is fixed to the corresponding finger base member 21 or to a member fixed thereto. In short, each of the flexible members 35 has both end sections thereof fixed to the corresponding finger base member 21 and to the other end of the corresponding swiveling members 40, thus substantially functioning as a both ends fixed.

For this reason, as shown in FIG. 24, each of the flexible members 35 is bent in a direction intersecting the longitudinal direction in a state where the amount of expansion/contraction in the longitudinal is relatively small, thereby allowing the finger base member 21 to move without changing the orientation thereof relative to the corresponding swiveling member 40 in a manner which is the same as or similar to the first and second embodiments. In short, each of the flexible members 35 constitutes a link mechanism for supporting the finger base member 21 so as to be displaceable in a direction intersecting the hand axial direction without changing the orientation thereof relative to the corresponding swiveling member 40.

Note that, in FIG. 24, each of the parallel links 30 is provided with a pair of flexible members 35, wherein one-side ends of the pair of flexible members 35 are connected by means of a basal-end-side member 35a, and the other-side ends of the pair of flexible members 35 are connected by means of a distal-end-side member 35b. In short, in FIG. 24, a rectangular integral component formed of the pair of flexible members 35, the basal-end-side member 35a, and the distal-end-side member 35b is used. In addition, in FIG. 24, the basal-end-side member 35a is fixed to the other end side of the corresponding swiveling member 40, and the distal-end-side member 35b is fixed to the corresponding finger base member 21.

Note that, without providing the basal-end-side member 35a and the distal-end-side member 35b in FIG. 24, each of the flexible members 35 can be made to function as described above by fixing one end of the flexible member 35 directly to the other end side of the swiveling member 40 and by fixing the other end of the flexible member 35 directly to the finger base member 21.

Figure 25A:
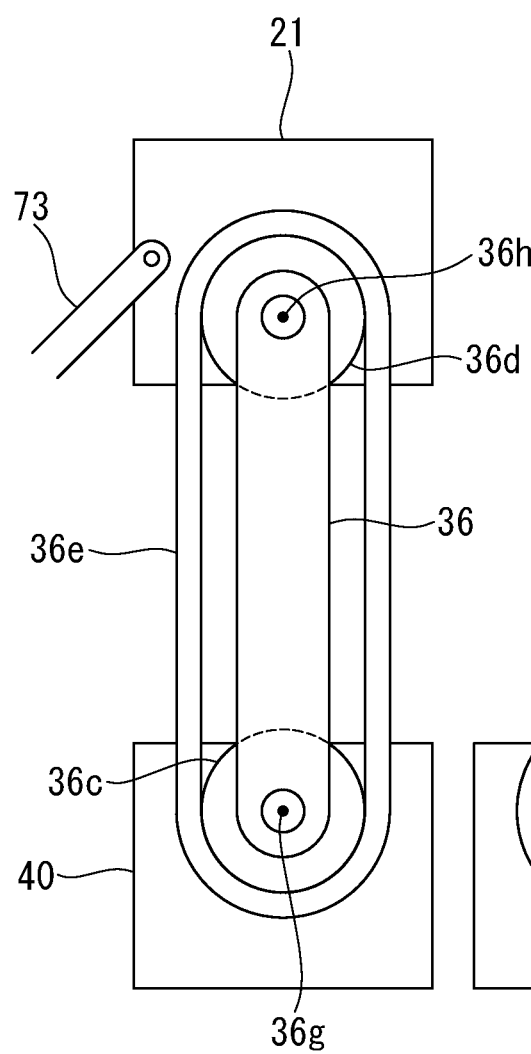
FIG. 25A is a model diagram showing a third modification of the hand according to the first embodiment.

In addition, in the first embodiment, the second embodiment, and the above-described various modifications, each of the finger base members 21 can be connected to the other end of the corresponding swiveling member 40 not by using the first link member 31 and second link member 32 but by using: a link member 36 one end of which is connected to the other end side of the swiveling members 40 and the other end of which is connected to the corresponding finger base member 21; a first pulley 36c fixed to the other end side of the corresponding swiveling member 40; a second pulley 36d fixed to the corresponding finger base member 21; and a wound member 36e, such as a chain or a belt, wound around the first pulley 36c and the second pulley 36d, as shown in FIG. 25(a). The wound member 36e is wound so as not to slip on the first pulley 36c and the second pulley 36d. The first pulley 36c and the second pulley 36d may be gears.

In this case, one end of the link member 36 is connected to the other end of the corresponding swiveling member 40 so as to be swingable about a swing axis 36g, and the other end of the link member 36 is connected to the corresponding finger base member 21 so as to be swingable about a swing axis 36h. The first pulley 36c is coaxial with the swing axis 36g, and the second pulley 36d is coaxial with the swing axis 36h. In addition, the outer diameter of the first pulley 36c is equal to the outer diameter of the second pulley 36d.

Figure 25B:
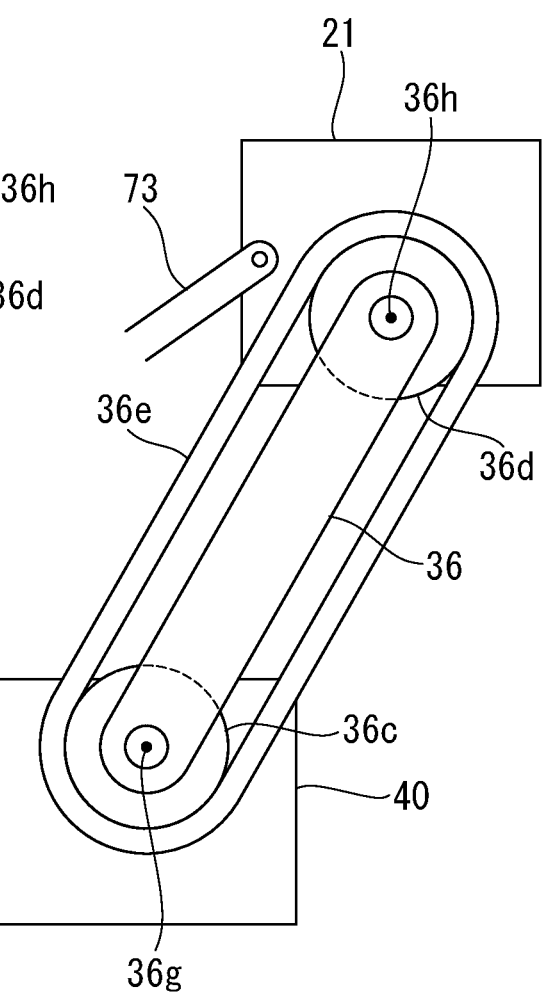
FIG. 25B is a model diagram showing the third modification of the hand according to the first embodiment.

With the above-described configuration, if each of the finger base members 21 is connected to the axial-direction moving members 70 and 80 via a shaft (drive link member) 73 or the like, as shown in FIG. 25(b), the finger base member 21 can be displaced in a direction intersecting the hand axial direction, by means of the second actuators 62 and 63, substantially without changing the orientation thereof. In other words, the link member 36, the first pulley 36c, the second pulley 36d, and the wound member 36e constitute a link mechanism for supporting the finger base member 21 so as to be displaceable in a direction intersecting the hand axial direction, substantially without changing the orientation thereof relative to the swiveling member 40.

Figure 26A:
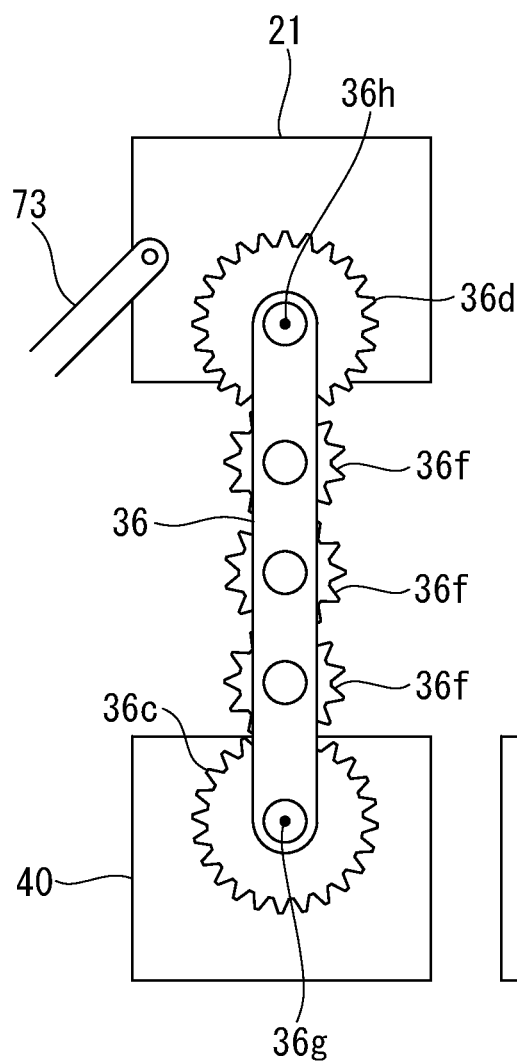
FIG. 26A is a model diagram showing a fourth modification of the hand according to the first embodiment.

In addition, as shown in FIG. 26(a), an odd number of gears 36f can be provided, instead of the wound member 36e. In this case, the first pulley 36c and the second pulley 36d are also gears. An odd number of gears 36f are rotatably supported on the link member 36 so as to be arranged in series, and the gears 36f are engaged with one another. In addition, one-end gear 36f of the gear array is engaged with the first pulley 36c, and the other-end gear 36f of the gear array is engaged with the second pulley 36d.

Figure 26B:
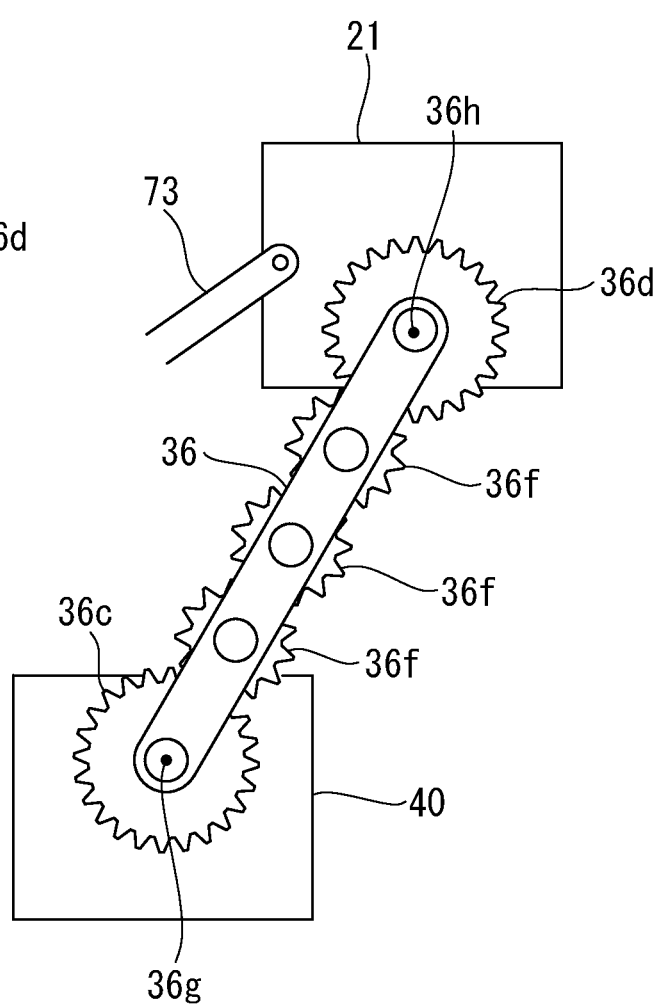
FIG. 26B is a model diagram showing a fourth modification of the hand according to the first embodiment.

Also in this case, as shown in FIG. 26(b), the finger base member 21 can be displaced by means of the second actuators 62 and 63 in a direction intersecting the hand axial direction, substantially without changing the orientation thereof. More specifically, the link member 36, the first pulley 36c, the second pulley 36d, and the odd number of gears 36f constitute a link mechanism for supporting the finger base member 21 so as to be displaceable in a direction intersecting the hand axial direction, substantially without changing the orientation thereof relative to the swiveling member 40. The number of gears 36f may be one or five or more.

Figure 27:
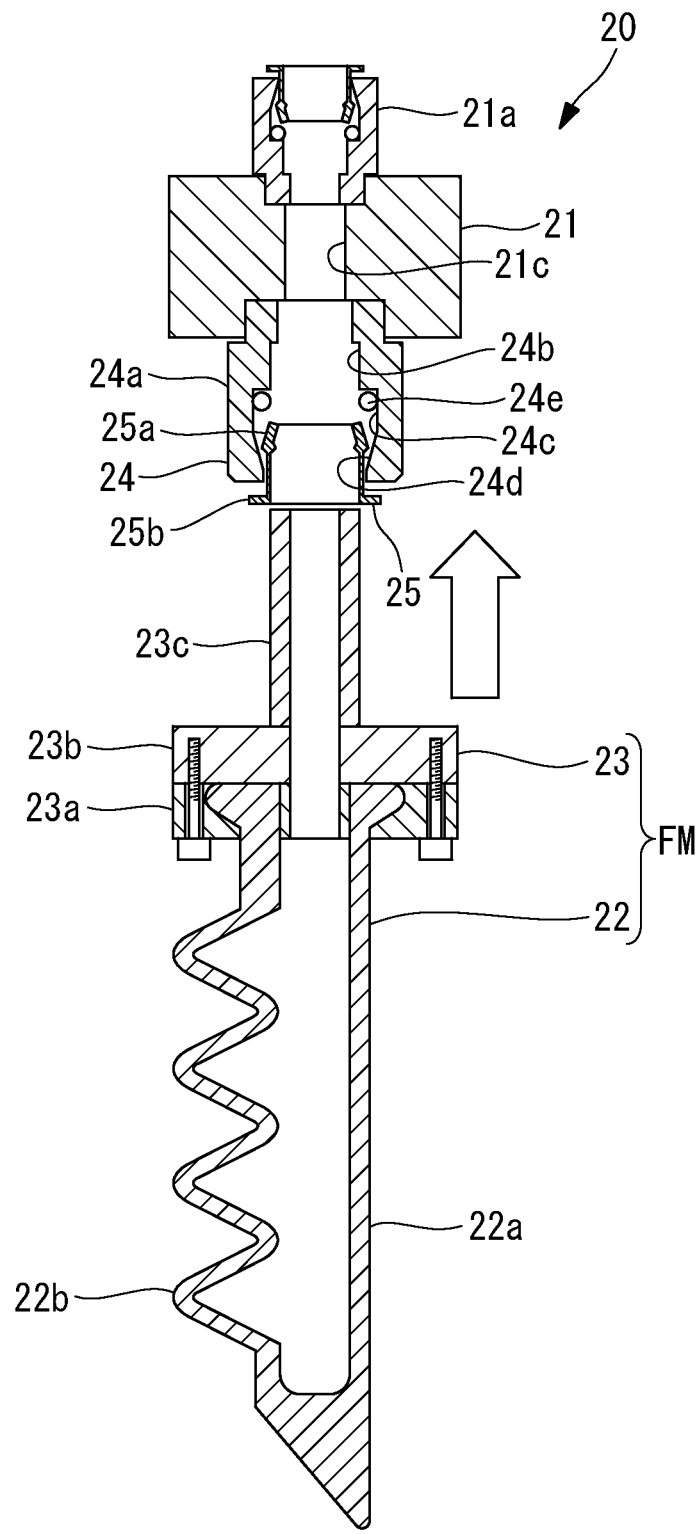
FIG. 27 is a diagram showing a finger of a third embodiment according to the present invention.
Figure 28:
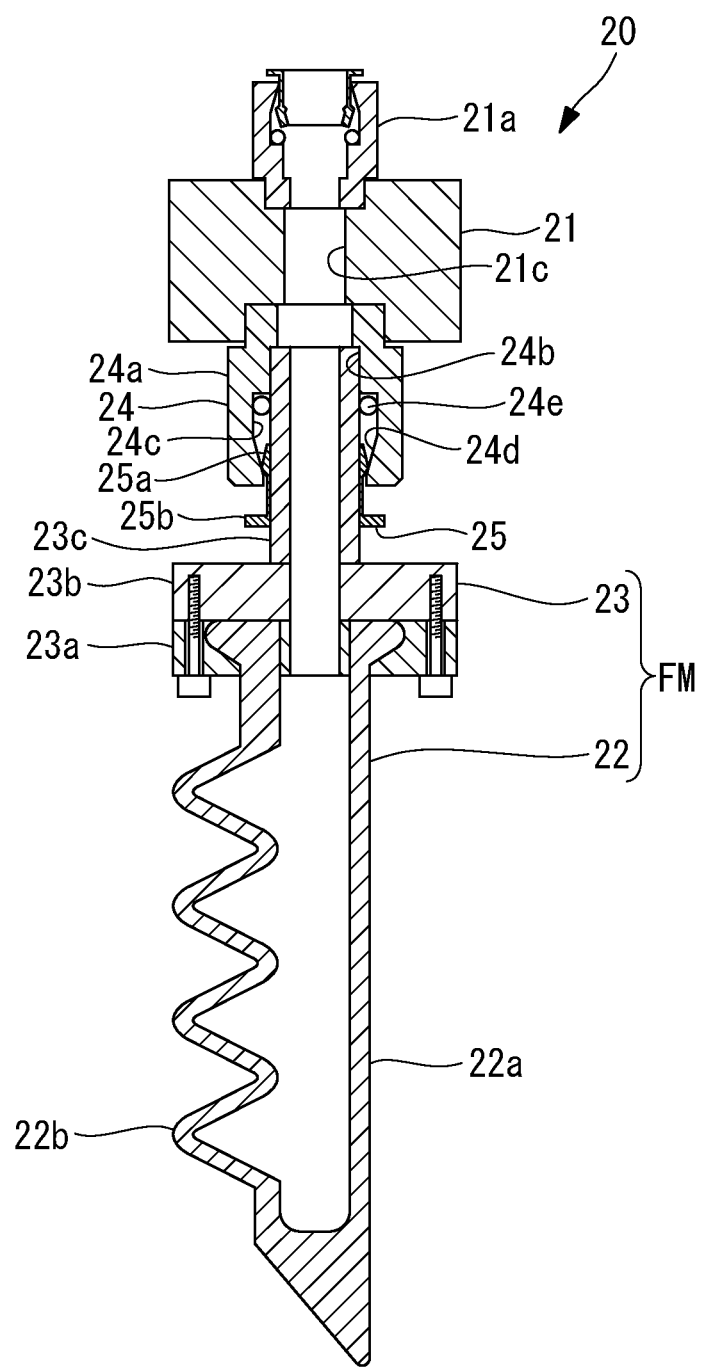
FIG. 28 is a diagram for illustrating an operation of the finger according to the third embodiment.
Figure 29:
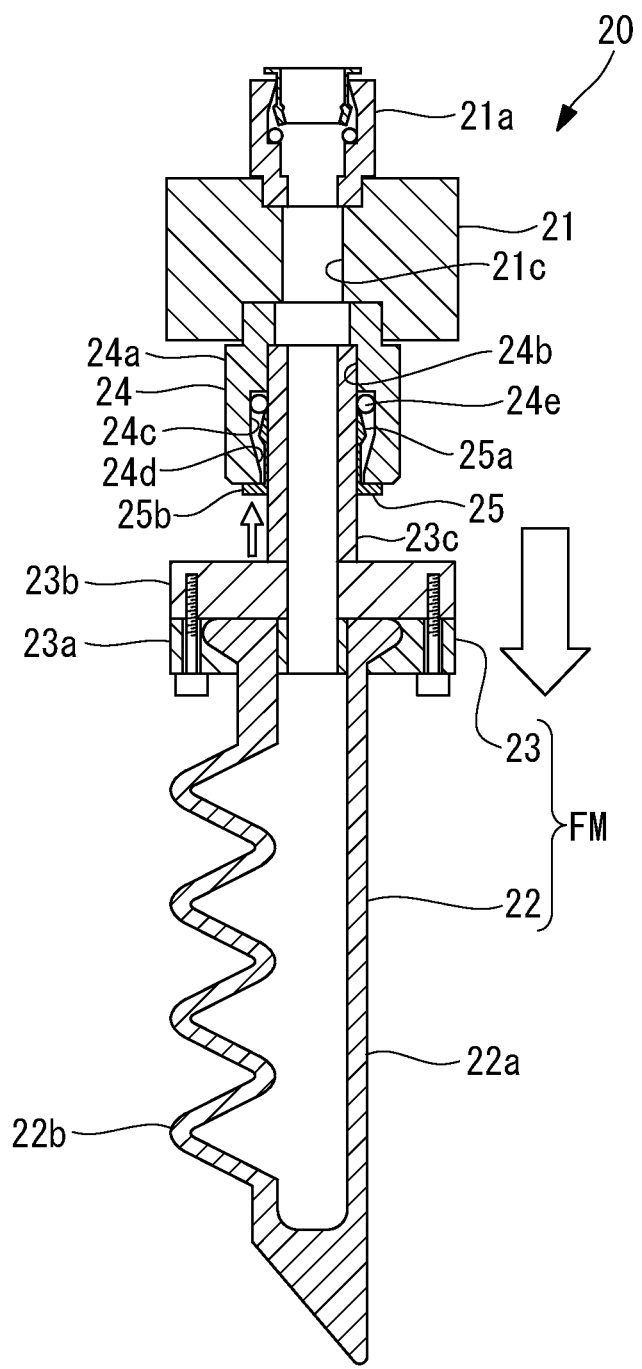
FIG. 29 is a diagram for illustrating an operation of the finger according to the third embodiment.

A gripping hand according to a third embodiment of the present invention will be described below with reference to the drawings. In the first embodiment, the second embodiment, and the above-described various modifications, the flexible finger parts 22 are fixed to the finger base members 21 with bolts, as shown in FIG. 4. In contrast, as shown in FIGS. 27 to 29, in the third embodiment, each of the fingers 20 is configured from: a flexible finger module FM having the flexible finger part 22 and a basal end member 23; and the finger base member 21 on which the flexible finger module FM is attachably/detachably mounted. The basal end member 23 is a member that is formed of plastic, metal, or the like and that has rigidity higher than the flexible finger part 22. Hereinafter, the distal end side of the flexible finger part 22 in each of the fingers 20 is referred to as a finger-distal-end side, and the side on which the coupler 21a of the finger base member 21 in the finger 20 is provided is referred to as a finger-basal-end side.

In the examples shown in FIGS. 27 to 29, the basal end member 23 includes a first member 23a and a second member 23b that sandwich a flange-shaped portion in the hand axial direction, said flange-shaped portion serving as an externally enlarged basal end of the flexible finger part 22. The first member 23a and the second member 23b are fastened with bolts, and the second member 23b, which is disposed closer to the finger-basal-end side than the first member 23a is, includes a tubular section 23c extending towards the finger-basal-end side.

On the other hand, a coupler 24 formed of plastic is fixed to the finger-distal-end side of the finger base member 21. The coupler 24 has a tubular coupler body 24a and a tubular locking member 25 mounted on the inner circumferential surface on the finger-distal-end side of the coupler body 24a. The internal hole of the coupler body 24a is communicatively connected to a pathway 21c in the corresponding finger base member 21.

The finger-basal-end side of the internal hole of the coupler body 24a constitutes a basal-end-side hole 24b having an internal shape that is equivalent to or slightly larger than the external shape of the tubular section 23c, and the finger-distal-end side of the internal hole of the coupler body 24a constitutes a distal-end-side hole 24c having a larger internal shape than the basal-end-side hole 24b. A sealing member 24e, such as an O-ring, is mounted on the finger-basal-end side of the distal-end-side hole 24c, and the internal shape of the sealing member 24e is smaller than the external shape of the tubular section 23c. In addition, the finger-distal-end side in the distal-end-side hole 24c constitutes a tapered surface 24d whose internal shape becomes progressively small.

The finger-basal-end side of the locking member 25 is disposed in the distal-end-side hole 24c. The finger-basal-end side of the locking member 25 includes an extension/contraction part 25a, and the finger-distal-end side of the locking member 25 includes a flange part 25b. The external shape of the flange part 25b is larger than the internal shape of the opening on the finger-distal-end side of the coupler body 24a. In addition, the external shape of the extension/contraction part 25a is smaller than the external shape on the finger-basal-end side of the distal-end-side hole 24c but is larger than the internal shape of the opening on the finger-distal-end side of the coupler body 24a. For this reason, when the locking member 25 is moved to the finger-distal-end side, the extension/contraction part 25a comes into contact with the tapered surface 24d, and when the locking member 25 is moved further to the finger-distal-end side in that state, the internal shape of the extension/contraction part 25a becomes small.

While not being in contact with the tapered surface 24d, the extension/contraction part 25a of the locking member 25 has an internal shape equivalent to the external shape of the tubular section 23c.

As shown in FIGS. 27 and 28, when the flexible finger module FM is to be mounted on the finger base members 21, the tubular section 23c of the flexible finger module FM is inserted into the internal hole of the locking member 25 of the coupler 24 of the finger base member 21 until the tubular section 23c is disposed in the basal-end-side hole 24b of the coupler body 24a. When a force towards the finger-distal-end side is applied to the flexible finger module FM in this state, the locking member 25 moves towards the finger-distal-end side together with the tubular section 23c, and the extension/contraction part 25a of the locking member 25 grasps the tubular section 23c, thus preventing the flexible finger module FM from coming off the finger base member 21.

Note that when the coupler 24 has high rigidity, the force applied to the flexible finger module FM may be received by the coupler 24 alone. In contrast, the finger base member 21 may include a support member for supporting the flexible finger module FM, so that this support member and the coupler 24 can receive the force applied to the flexible finger module FM.

On the other hand, as shown in FIG. 29, the flexible finger module FM can be removed from the finger base member 21 by extracting the tubular section 23c from the coupler 24 while pushing the locking member 25 towards the finger-basal-end side.

Because the flexible finger part 22 is formed of, for example, an elastomer material having rubber-like elasticity, it requires frequent replacement and maintenance, compared with a metal member. For this reason, a structure that allows the flexible finger module FM to be easily attached to and detached from the finger base member 21, as described above, is advantageous in reducing the time required for replacement work and maintenance work.

Figure 30:
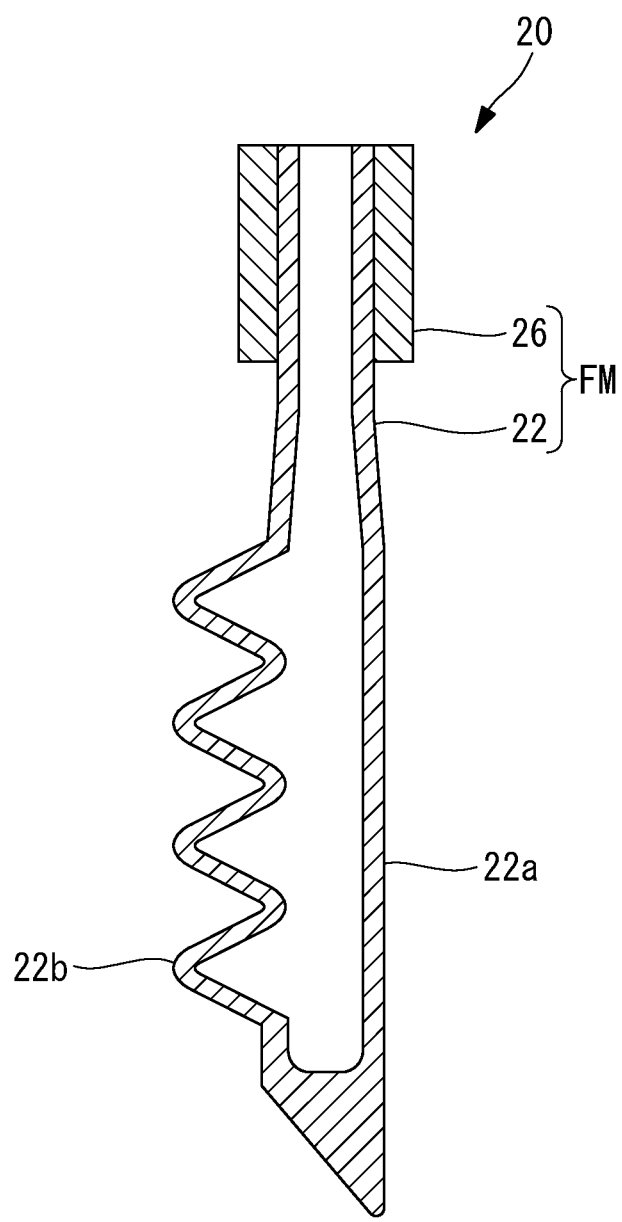
FIG. 30 is a diagram showing a first modification of a flexible finger unit according to the third embodiment.

Note that, in the third embodiment, the flexible finger module FM can also be configured as shown in FIG. 30. The flexible finger module FM in FIG. 30 has a plastic or metal tubular section 26 on the finger-basal-end side thereof. More specifically, the finger-basal-end side of the flexible finger part 22 is formed in a tubular shape, and a plastic or metal tubular member is fixed by adhesion etc. to the outer circumferential surface of this tube-shaped portion. Also with this configuration, the tubular section 26 of the flexible finger module FM can be attachably/detachably mounted on the coupler 24 of the finger base member 21.

Figure 31:
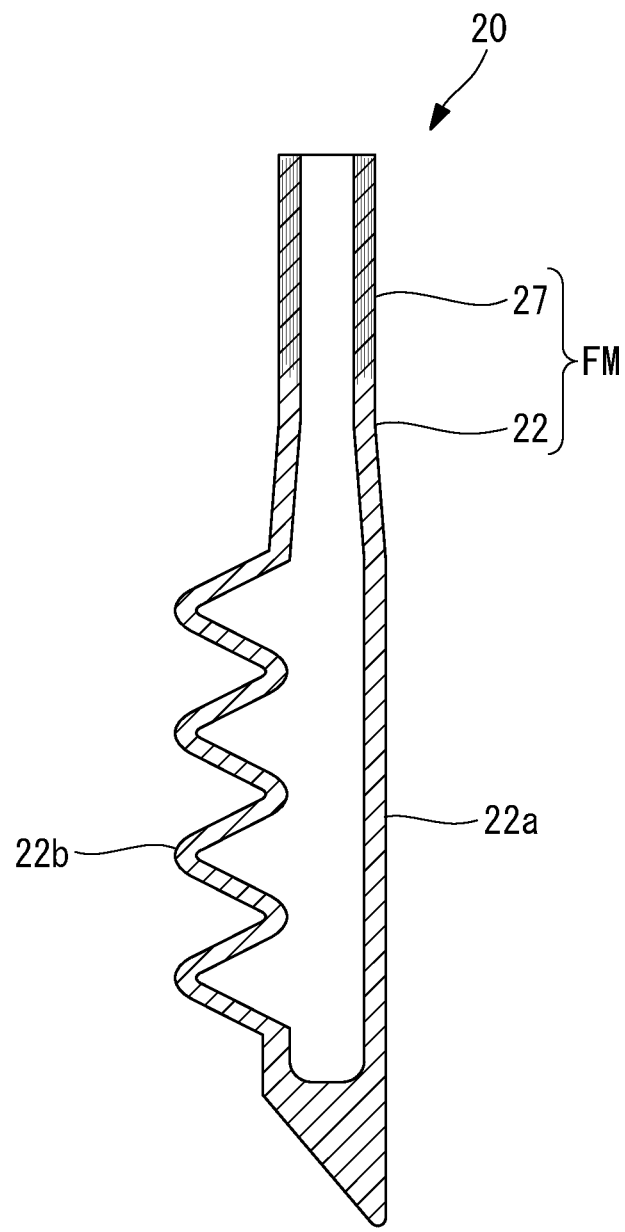
FIG. 31 is a diagram showing a second modification of the flexible finger unit according to the third embodiment.

Furthermore, in the third embodiment, the flexible finger module FM can also be configured as shown in FIG. 31. In the flexible finger module FM shown in FIG. 31, because a spirally disposed wire, a reinforcing fiber, and another reinforcing member are inserted in the interior of a tubular section 27 on the finger-basal-end side of the flexible finger part 22, the rigidity of the tubular section 27 is higher than the rigidity of the other portions of the flexible finger part 22. Also with this configuration, the tubular section 27 of the flexible finger module FM can be attachably/detachably mounted on the coupler 24 of the finger base member 21.

A gripping hand according to a fourth embodiment of the present invention will be described below with reference to the drawings. The fourth embodiment is configured by providing the first to third embodiments and the above-described various modifications with a flow-volume adjusting valve 51 at an intermediate position in the tube 21b for supplying and discharging a pressure control fluid to and from each of the plurality of flexible finger parts 22.

As shown in FIGS. 32 to 36, each of the flow-volume adjusting valves 51 has a valve case 52, as well as a first valve element 53 and a second valve element 54 accommodated in the valve case 52. One end side of the valve case 52 is communicatively connected to the compressor 100 side via the tube 21b, and the other end side of the valve case 52 is connected to the finger base member 21 via the tube 21b.

Figure 36:
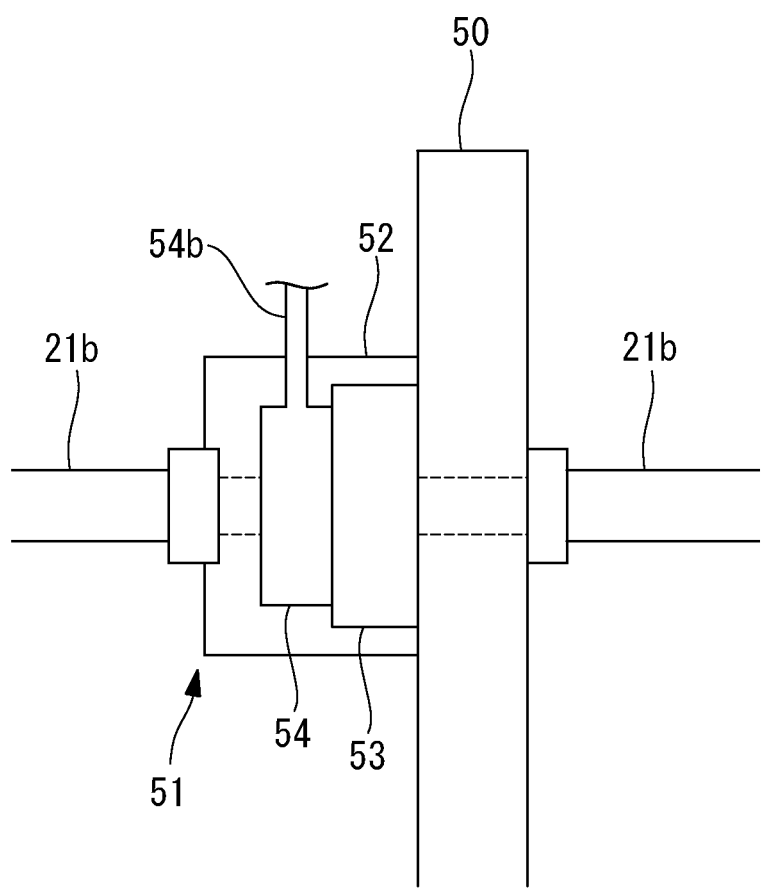
FIG. 36 is a diagram showing a schematic structure of a flow-volume adjusting valve of the hand according to the fourth embodiment.

In this embodiment, the first valve element 53 and the second valve element 54 are swingable relatively to each other about a swing axis 51a and have a valve revolution mechanism for revolving at least one of the first valve element 53 and the second valve element 54. In this embodiment, the first valve element 53 is fixed to the base member 50, and the second valve element 54 swings by means of the valve revolution mechanism about a revolving axis 50a. In this embodiment, as shown in FIG. 36, a protruding part 54b protruding from the second valve element 54 in a direction orthogonal to the revolving axis 51$a$ constitutes the valve revolution mechanism.

Figure 32:
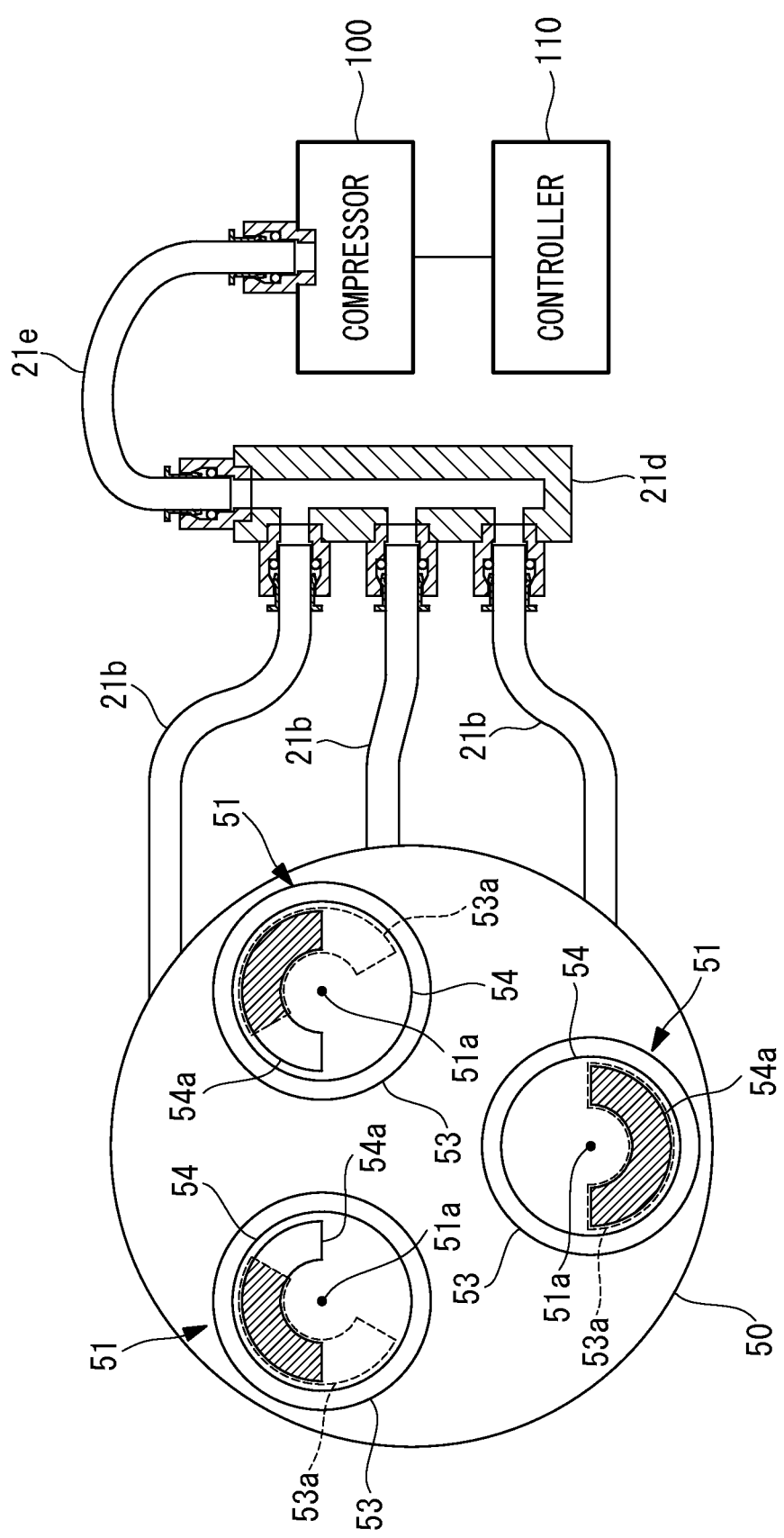
FIG. 32 is a diagram showing the vicinity of a base member of a hand according to a fourth embodiment of the present invention.
Figure 33:
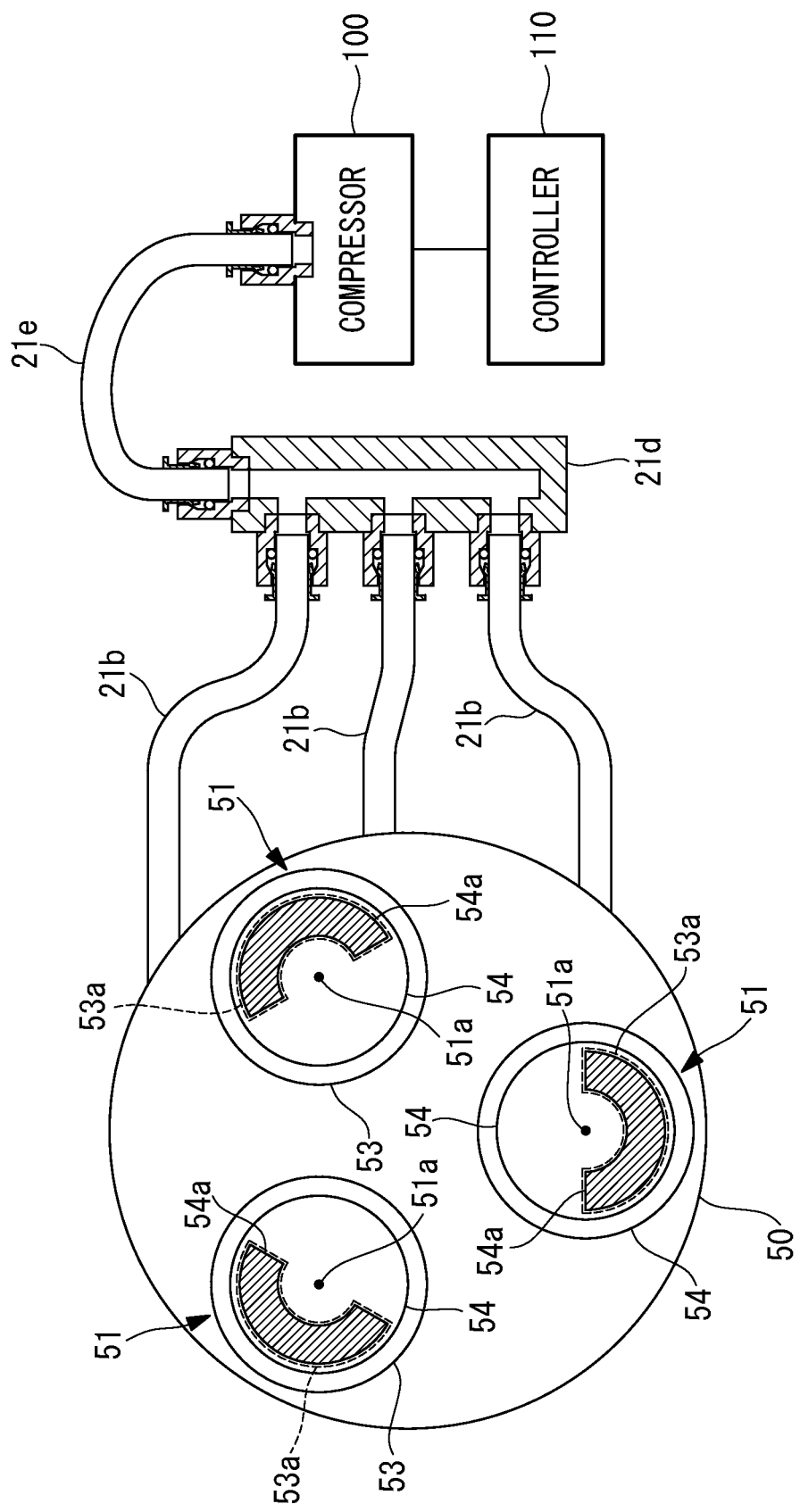
FIG. 33 is a diagram showing the vicinity of the base member of the hand according to the fourth embodiment.

The second valve element 54 swings about the revolving axis 51$a$ in a manner operatively associated with swiveling of the swiveling member 40. For example, when two of the swiveling members 40 swivel by substantially 30° about the swiveling axes 40$a$ so that the three fingers 20 transit from the state in FIG. 34 to the state in FIG. 35, the second valve elements 54 of the two respective flow-volume adjusting valves 51 swing about the revolving axes 51$a$ from the state in FIG. 33 to the state in FIG. 32. In FIGS. 32 and 33, the areas in which flow channels 53$a$ of the first valve elements 53 and flow channels 54$a$ of the second valve elements 54 overlap each other (corresponding to degrees of valve opening) are diagonally hatched. Although each of the revolving axes 51$a$ and the corresponding swiveling axis 40$a$ are coaxially arranged in this embodiment, it is not necessary that each of the revolving axes 51$a$ and the corresponding swiveling axis 40$a$ are coaxially arranged.

In this embodiment, each of the protruding parts 54$b$ is connected to the corresponding swiveling member 40. By doing so, swiveling of each of the swiveling members 40 and revolution of the corresponding second valve element 54 are operatively associated with each other. On the other hand, swiveling of the swiveling member 40 can also be operatively associated with revolution of the corresponding second valve element 54 by providing a gear on the outer circumferential surface of the second valve element 54, causing this gear to be engaged with at least another gear, and causing this other gear to be engaged with the gear provided on the first actuator 61 or the swiveling member 40. In this case, it is not necessary that each of the revolving axes 51$a$ and the corresponding swiveling axis 40$a$ are coaxially arranged.

In this manner, when the first valve element 53 and the second valve element 54 are configured so as to swing relatively to each other in conjunction with swiveling of the swiveling member 40, the degree of valve opening of each of the flow-volume adjusting valves 51 changes in conjunction with swiveling of the corresponding swiveling member 40, as shown in FIGS. 32 and 33.

Figure 34:
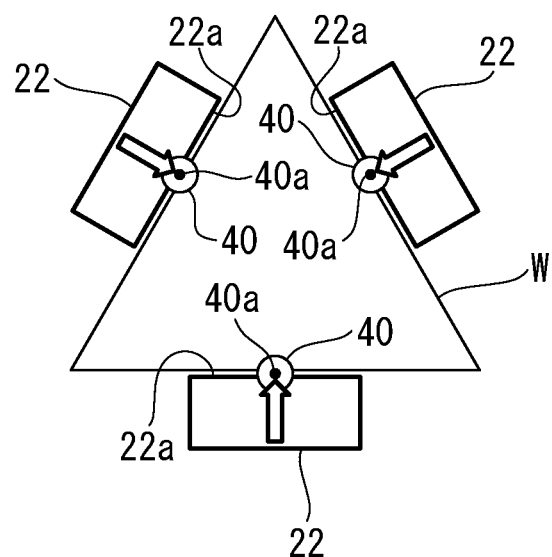
FIG. 34 is a diagram for illustrating an operation of the hand according to the fourth embodiment.
Figure 35:
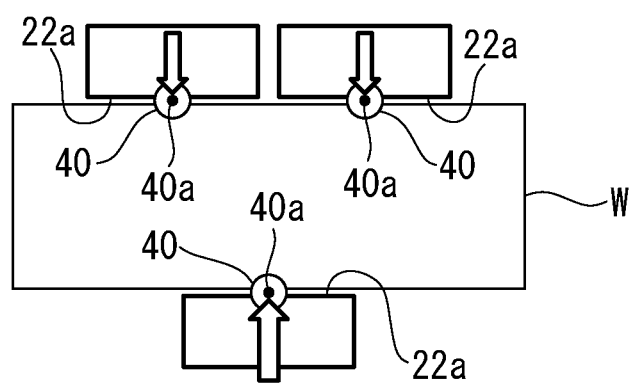
FIG. 35 is a diagram for illustrating an operation of the hand according to the fourth embodiment.

The degrees of valve opening of all flow-volume adjusting valves 51 are equal, as shown in FIG. 33, in a state where the gripping walls 22$a$ of the flexible finger parts 22 of the three fingers 20 face the hand central line CL as shown in, for example, FIG. 34. However, when the swiveling members 40 of two fingers 20 are swiveled by substantially 30°, as shown in FIG. 35, so that the gripping walls 22$a$ of the flexible finger parts 22 of these two fingers 20 face in the opposite direction to that of the gripping wall 22$a$ of the flexible finger part 22 of the other one finger 20 that has not been swiveled, the degrees of valve opening of the two flow-volume adjusting valves 51 of the two fingers 20 that have been swiveled become small. Because a finger 20 whose degree of valve opening is large has a larger amount of pressure control fluid supplied to and discharged from the interior of the flexible finger part 22 than a finger 20 whose degree of valve opening is small, the gripping forces produced by the flexible finger parts 22 of the fingers 20 differ according to the degrees of valve opening.

Also, compared with cases where the gripping forces of all the fingers 20 are equal, stable gripping may be achieved in cases where the gripping forces of two swiveled fingers 20 are smaller than the gripping force of the other non-swiveled one finger 20, as shown in, for example, FIG. 35. Because degree of valve opening adjustment of the tube 21$b$ for supplying and discharging a pressure control fluid to and from the flexible finger part 22 of each of the fingers 20 are automatically performed according to the swiveling position of the finger 20, control processing for sending a control signal to an electromagnetic valve etc. can be omitted, and furthermore the reliability of valve opening adjustment mechanism can be enhanced by omitting a step of controlling each of the flow-volume adjusting valves 51 with a control signal.

Note that, in the first to fourth embodiments and the above-described various modifications, it is possible to provide a cover for covering the finger base members 21, parallel links 30, swiveling members 40, base member 50, first and second actuators 61, 62, and 63, and axial-direction moving members 70 and 80. The cover may be formed of a material having rubber-like elasticity or may be formed of plastic.

By providing a cover, even if the gripping hand accidentally comes into contact with the grasp object W, other members, persons, etc., it is possible to reduce or eliminate damage not only to the grasp object W, the other members, the persons, etc. but also to the gripping hand.

Note that, in the first to fourth embodiments and the above-described various modifications, it is also possible to configure a hand system or a robot system that uses the gripping hand in conjunction with a visual sensor, such as a camera. In this case, the visual sensor may be provided at a location different from the position of the gripping hand or may be mounted on the gripping hand. Furthermore, the visual sensor may be disposed in the hollow portion of the flexible finger part 22 of a finger 20 of the gripping hand.

In this case, the visual data obtained by the visual sensor is sent to the control device 200, and the control unit 201 of the control device 200 controls the gripping hand on the basis of the visual data. For example, a model of a grasp object W to be gripped is stored in advance in the storage device 203 of the control device 200, so that the control unit 201 determines the position and orientation of the grasp object W in the visual data on the basis of the model, and then the control unit 201 controls the first actuators 61, the second actuator 62, the compressor 100, etc. by using the results of this determination.

In addition, finger arrangement data according to the types of grasp objects W to be gripped, said finger arrangement data indicating the position of the finger base member 21 of each of the fingers 20 in a direction intersecting the hand axial direction and the position of the finger base member 21 in the swivel direction, can be stored in advance in the storage device 203, so that when the control device 200 receives the type of a grasp object W to be gripped, the control unit 201 can refer to this finger arrangement data and adjust the position of each of the finger base members 21 in a direction intersecting the hand axial direction and the orientation of the finger base member 21 in the swivel direction according to the type of this grasp object W.

Furthermore, the control unit 201 can also determine the position and orientation of the grasp object W in the visual data on the basis of the model and thereby adjust the position of each of the finger base members 21 in a direction intersecting the hand axial direction and the orientation of the finger base member 21 in the swivel direction on the basis of the determined orientation of the grasp object W. For example, when a columnar grasp object W is to be gripped along the axial direction thereof, the finger base members 21 are arranged as shown in FIG. 34, and when this columnar grasp object W is to be gripped along the radial direction thereof, the finger base members 21 are arranged as shown in FIG. 35. In this manner, adjusting the position and the orientation of each of the finger base members 21 according to the position, the orientation, etc. of the grasp object W is advantageous in enhancing the degree of freedom of gripping the grasp object W.

In addition, the gripping reaction forces exerted on the flexible finger parts 22 can be concentrated in a suitable direction by controlling the orientation of each of the finger base members 21 about the swiveling axis 40a so that the gripping walls 22a of the flexible finger parts 22 face the surfaces of the grasp object W as shown in FIGS. 34 and 35. In addition, each of the flexible finger parts 22 does not easily deflect in an unfavorable direction, affording an advantage in enhancing the durability of the flexible finger parts 22.

Moreover, because the gripping wall 22a of each of the flexible finger parts 22 can be oriented in a suitable direction, the force that should be produced by each of the flexible finger parts 22 can be reduced, compared with a case where the gripping wall 22a of each of the flexible finger parts 22 is not oriented in a suitable direction. This means that the gripping capability of each of the flexible finger parts 22 is enhanced.

Furthermore, the present invention can also be configured so that the control unit 201 determines at least one of the positions, the orientations, and the shapes of a grasp object W, an obstacle, etc., other than the grasp object W to be gripped in the visual data, thereby allowing the control unit 201 to adjust the position and orientation of each of the finger base members 21 by using the results of this determination.

The gripping hand according to the first to fourth embodiments and the various modifications includes: a base member 50; and a plurality of fingers 20 arranged about a hand central line CL that passes through the base member 50, wherein each of the fingers 20 has a flexible finger part 22 having flexibility and a finger base member 21 for supporting a basal end side of the flexible finger part 22, and the gripping hand includes a plurality of link mechanisms (the parallel link 30; the above-described link mechanism using the plurality of flexible members 35; the above-described link mechanism using the link member 36, the first pulley 36c, the second pulley 36d, and the wound member; and the above-described link mechanism using the link member 36, the first pulley 36c, the second pulley 36d, and an odd number of gears 36f) that are supported on the plurality of swiveling members 40 mounted on the base member 50 and that support the plurality of finger base members 20.

In addition, each of the plurality of link mechanisms allows the corresponding finger base member 21 supported thereby to move relative to the base member 50 such that the orientation of the finger base member 21 supported thereby does not substantially change relative to the base member 50. In these embodiments, the direction of this movement is a direction intersecting the hand axial direction.

Due to this configuration, the positions of the fingers 20 relative to one another can be changed such that the orientation of the distal end portion of each of the fingers 20 does not substantially change relative to the base member 50.

For example, when a small grasp object W is to be gripped, the plurality of fingers 20 move so as to approach one another such that the orientation of the distal end portion of each of the fingers 20 does not substantially change relative to the base member 50, whereby the gripping hand can behave as if the base member 50 became substantially narrow. When a large grasp object W is to be gripped, the plurality of fingers 20 move away from one another such that the orientation of the distal end portion of each of the fingers 20 does not substantially change relative to the base member 50, whereby the gripping hand can behave as if the base member 50 effectively became wide.

For this reason, even if the movable range of each of the fingers 20 is small or almost zero, the grasp object W can be gripped by moving the plurality of fingers 20 by means of the above-described link mechanisms so as to approach one another. In addition, because each of the fingers 20 includes the flexible finger part 22, even a irregularly shaped and delicate grasp object W, such as food, can be gripped appropriately.

In addition, no slide rails are used to move each of the finger base members 21, and this is advantageous in configuring the gripping hand so as to be compact.

Here, because the grasp object W is gripped using the flexible finger parts 22 having flexibility, the flexible finger parts 22 deform flexibly according to the shape of the grasp object W. This leads to an increase in the contact areas between the grasp object W and the flexible finger parts 22 and is advantageous in stably gripping the grasp object W.

In addition, because the position of each of the finger base members 21 can be adjusted by means of the above-described link mechanisms in a direction intersecting the hand central line CL, the pressure of a pressure fluid when the same grasp object W is held can be reduced, compared with a case where such position adjustment of the finger base members 21 cannot be performed.

In addition, because the grasp object W is gripped by using the flexible finger parts 22 having flexibility, the load applied to the mechanisms for supporting each of the fingers 20 is reduced even if the distal end side of each of the fingers 20 accidentally collides with the grasp object W or an obstacle, thus decreasing the risk that the gripping hand becomes defective.

Note that these embodiments are configured so that, because the walls (stretchable walls 22b) disposed at positions that are further away from the hand central line CL than the respective gripping walls 22a are in the flexible finger parts 22 have a corrugated shape, the distal end sides of the flexible finger parts 22 deflect towards the hand central line CL side when pressure control fluids are supplied.

In contrast, a plurality of reinforcing fibers can also be provided in the gripping walls 22a of the flexible finger parts 22 such that the reinforcing fibers extend in the longitudinal directions of the flexible finger parts 22. In this case, even if the stretchable walls 22b are not formed in a corrugated shape, the distal end sides of the flexible finger parts 22 deflect towards the hand central line CL side when pressure control fluids are supplied. Conversely, it is also possible to impart a corrugated shape to the gripping walls 22a without imparting a corrugated shape to the stretchable walls 22b. In this case, the distal end sides of the flexible finger parts 22 deflect towards the hand central line CL side when pressure control fluids are discharged. The present invention may also be configured so that when a pressure control fluid is supplied or discharged, the distal end side of each of the flexible finger parts 22 deflects towards the hand central line CL side by using another well-known method.

In addition, although the three fingers 20 are provided about the hand central line CL in these embodiments, four or more fingers 20 may be provided about the hand central line CL.

Furthermore, although the plurality of fingers 20 are provided about the hand central line CL of the disc-shaped base member 50 in these embodiments, the base member 50 may be formed in a block shape or another complicated shape, in which case also the plurality of fingers 20 can be provided about the hand central line CL passing through the base member 50. Note that when the base member 50 is a member having an opening in the vicinity of the center thereof, such as a doughnut-shaped circular disc, the hand central line CL is inserted through the base member 50.

In addition, although the hand central line CL can be determined in various manners, the hand central line CL in these embodiments can be, for example, a line that, when imaginary planes passing through the basal end surfaces of the respective plurality of flexible finger parts 22 provided on the gripping hand are defined in a state where the plurality of flexible finger parts 22 are arranged at respective predetermined positions, is orthogonal to these imaginary planes and that passes through a position separated from the basal end surfaces by the same distance.

The above-described predetermined positions can be, for example, the positions of the flexible finger parts 22 when the above-described link mechanisms are operated so that the plurality of flexible finger parts 22 are furthest away from one another, the positions of the flexible finger parts 22 when the above-described link mechanisms are operated so that the plurality of flexible finger parts 22 are closest to one another, etc.

Note that the plurality of fingers 20 are provided about the central axis of the base member 50 in these embodiments. In this manner, even if the plurality of fingers 20 are provided about the central axis of the base member 50 or another axis line passing through or inserted through the base member 50, the same effects as described above can be achieved.

Note that in these embodiments, the above-described plurality of link mechanisms are supported on the respective plurality of swiveling members 40 mounted on the base member 50 while supporting the respective plurality of finger base members 21.

In contrast, the gripping hand may be configured such that, without providing the swiveling members 40, the plurality of link mechanisms are supported on the base member 50, and the plurality of fingers 20 are supported by the respective link mechanisms.

For example, in the first embodiment, one end of the first link member 31 and one end of the second link member 32 of each of the parallel links 30 can be linked to the base member 50 so as to be swingable. Also in this case, the positions of the fingers 20 relative to one another can be changed such that the orientations of the distal end portions of the fingers 20 do not substantially change relative to the base member 50, thereby bringing about the same effects as described above.

In addition, in the gripping hand according to the first to fourth embodiments and the various modifications, the plurality of swiveling members 40 arranged about the hand central line CL are provided, each of the swiveling members 40 is mounted on the base member 50 so as to be swiveable about the swiveling axis 40a extending in a direction substantially along the hand central line CL, and the plurality of link mechanisms are supported on the respective plurality of swiveling members 40.

For this reason, by means of the above-described link mechanisms, it is possible to adjust the positions of the plurality of fingers 20 relative to one another and to adjust the orientations of the fingers 20 about the swiveling axes 40a such that the orientations of the distal end portions of the fingers 20 do not substantially change relative to the base member 50. This is advantageous in increasing the number of types of grasp objects W that can be gripped.

In addition, in the gripping hand according to the above-described first to fourth embodiments and the above-described various modifications, the swiveling members 40 can be swiveled by means of the first actuators 61, and this is advantageous in reducing the load and time for adjusting the orientations of the fingers 20 about the swiveling axes 40a.

In addition, in the gripping hand according to the above-described first to fourth embodiments and the above-described various modifications, the link mechanisms are formed of the parallel links 30. With this configuration, the positions of the plurality of fingers 20 relative to one another can be changed such that the orientations of the finger base members 21 do not change, or barely change, relative to the base member 50. For this reason, it is easier to estimate the orientation of each of the flexible finger parts 22 relative to the base member 50, affording an advantage in accurately controlling the gripping hand that uses the flexible finger parts.

In addition, in the gripping hand according to the above-described first to fourth embodiments and the above-described various modifications, the finger base members 21 can be moved by means of the second actuators 62 and 63, and this is advantageous in reducing the load and time for adjusting the positions of the fingers 20.

Furthermore, these embodiments include: the axial-direction moving members 70 and 80 that move by means of the second actuators 62 and 63 relative to the base member 50 in a direction along the hand central line CL; and drive link members 34, 71, 72, and 73 for linking the axial-direction moving members 70 and 80 to the finger base members 21 or to the finger base member 21 sides of the above-described link mechanisms.

Because the plurality of fingers 20 are arranged about the hand central line CL, providing the axial-direction moving members 70 and 80 that move in a direction along the hand central line CL is advantageous in reducing the size of the gripping hand in a direction orthogonal to the hand central line CL, compared with a case where a moving member that moves in a direction orthogonal to the hand central line CL is provided.

In addition, if the plurality of finger base members 21 are configured so as to move independently of one another relative to the base member 50 or to the swiveling members 40, as described above, the positions of the plurality of finger base members 21 relative to the base member 50 or to the swiveling members 40 can be adjusted independently of one another by means of the respective second actuators 63. This is advantageous in widening the applicable range of the grasp object W.

In addition, the gripping hand according to the above-described first to fourth embodiments and the above-described various modifications include the control unit 201 for controlling the second actuators 62 and 63, and the control unit 201 controls the second actuators 62 and 63 so that the finger base members 21 are arranged at positions according to the type of the grasp object W.

With this configuration, the positions of the fingers 20 are automatically changed according to the type of the grasp object W, which is advantageous in enhancing the gripping quality of the gripping hand that uses the flexible finger parts 22.

In addition, because the fingers 20 can be arranged at appropriate positions according to the type of the grasp object W, the flexible finger parts 22 deforming along the grasp object W can be made to run more faithfully along the grasp object W. This enables many types of grasp objects W to be stably gripped with the single gripping hand, making it possible not only to enhance the gripping quality of the gripping task but also to increase the speed of gripping task.

In addition, the gripping hand according to the first to fourth embodiments and the various modifications includes: the control unit 201 for controlling the second actuators 62 and 63; the compressor 100 for supplying and discharging a pressure control fluid to and from the interior of each of the flexible finger parts 22; and the storage device 203 for storing information about the correspondence relationship between the amount and the pressure of the pressure control fluid supplied and discharged by the compressor 100 and changes in behavior and a physical property of the corresponding flexible finger part 22, wherein the control unit 201 determines a position to which each of the finger base members is moved by means of the second actuators 62 and 63 by using at least the amount and the pressure of the pressure control fluid supplied and discharged by the compressor 100 to and from each of the corresponding flexible finger part 22 and the information about the correspondence relationship.

Behavior, such as the amount of deformation, and a physical property, such as the spring constant, of each of the flexible finger parts 22 change according to the amount and pressure of the pressure control fluid that is supplied and discharged. For example, when the amount of the supplied pressure control fluid increases, the amount of deformation of the corresponding flexible finger part 22 inwardly of the hand increases, and the spring constant of the corresponding flexible finger part 22 also increases. For this reason, if the positions of the plurality of finger base members 21 relative to one another are fixed and in the case where, for example, grasp objects W having various sizes are to be gripped, the gripping force exerted on the grasp object W differs greatly between the case where a large grasp object W is gripped and the case where a small grasp object W is gripped.

In contrast, with the above-described configuration, the positions to which the finger base members 21 are moved by means of the second actuators 62 and 63 are determined by using at least the amount and pressure of the pressure control fluid supplied and discharged by the compressor 100 to and from each of the flexible finger parts 22 and the information about correspondence relationship. For this reason, it is possible to appropriately adjust the gripping forces exerted on the grasp objects W having various sizes.

In addition, the gripping hand according to the first to fourth embodiments and the various modifications includes: the compressor 100 for supplying and discharging a pressure control fluid to and from the interior of each of the flexible finger parts 22; the storage device 203 for storing information about the correspondence relationship between the amount and the pressure of the pressure control fluid supplied and discharged by the compressor 100 and changes in behavior and a physical property of the corresponding flexible finger part 22; and the control unit 201 that, when a grasp object W is gripped by means of each of the flexible finger parts 22, estimates a gripping position at which the grasp object W is gripped in the corresponding flexible finger part 22, by using at least the amount and the pressure of the pressure control fluid supplied and discharged by the compressor 100 to and from the corresponding flexible finger part 22 and the information about the correspondence relationship.

Due to this configuration, by estimating the gripping position, which is a position, area, etc. where the grasp object W is gripped, in each of the flexible finger parts 22, it is possible to control the gripping position when the grasp object W is to be gripped, thus affording an advantage in enhancing the gripping quality.

In addition, the gripping hand according to the first to fourth embodiments and the various modifications includes: the compressor 100; and the tube 21b for connecting the compressor 100 and each of the flexible finger parts 22, wherein a portion of the tube 21b between the base member 50 and each of the flexible finger parts 22 extends in a direction along the swiveling axis 40a of the corresponding swiveling member 40 and is disposed in the vicinity of the swiveling axis 40a. For this reason, the tube 21b between the base member 50 and each of the flexible finger parts 22 does not interfere when a movable section of the gripping hand is driven, thereby preventing the tube 21b from being damaged, coming off, etc.

In the gripping hand in the above-described third embodiment and the modifications thereof, the flexible finger parts 22 are attachably/detachably connected to the respective finger base members 21.

Because the flexible finger parts 22 have flexibility, they require frequent replacement and maintenance, compared with metal members. For this reason, a structure that allows the flexible finger parts 22 to be attachably/detachably connected to the finger base members 21, as described above, is advantageous in reducing the time required for replacement work and maintenance work.

More specifically, the basal end of each of the flexible finger parts 22 is provided with the tubular sections 23c, 26, and 27 that have higher rigidity than the flexible finger part 22 and that are communicatively connected to the hollow portion of the flexible finger part, each of the above-described finger base members is provided with the coupler 24 having a flow channel for supplying and discharging a pressure control fluid to and from the corresponding flexible finger part 22, and the tubular sections 23c, 26, and 27 of the flexible finger part 22 are attachably/detachably connected to the coupler 24 of the finger base member 21.

With this configuration, each of the flexible finger parts 22 can be attached and detached by attaching and detaching the tubular sections 23c, 26, and 27 at the basal ends of the flexible finger part 22 to and from the coupler 24 of the finger base member 21, making it possible to reduce the time for replacement work and maintenance work.

The gripping hand in the above-described fourth embodiment and the modifications thereof includes: the compressor 100; the plurality of tubes 21b for connecting the compressor 100 and the respective plurality of flexible finger parts 22; and the plurality of flow-volume adjusting valves 51 provided at intermediate positions in the respective plurality of tubes 21b, wherein the plurality of flow-volume adjusting valves 51 for the respective plurality of flexible finger parts 22 are valves whose degrees of valve opening change according to swiveling of the swiveling members 40 of the respective flexible finger parts 22.

With this configuration, because degree of valve opening adjustment of the tube 21b for supplying and discharging a pressure control fluid to and from the flexible finger part 22 of each of the fingers 20 is automatically performed according to the swiveling position of the finger 20, control processing for sending a control signal to an electromagnetic valve etc. can be omitted, and furthermore the reliability of the degree of valve opening adjustment mechanism can be enhanced by omitting a step of controlling each of the flow-volume adjusting valves 51 with a control signal.

In addition, the control unit 201 can determine the positions to which the finger base members should be moved by means of the second actuators 62 and 63 by using visual data obtained by the visual sensor, and the control unit 201 can adjust the position of each of the finger base members 21 in a direction intersecting the hand central line CL, for example, on the basis of the orientation of the grasp object W in the visual data. If the grasp object W is shaped like a circular column, the gripping quality can be enhanced by changing the position of each of the finger base members 21 between a case where the grasp object W is to be gripped in the axial direction and a case where the grasp object W is to be gripped in the radial direction.

The following aspects of the present invention are derived from the above disclosure.

A first aspect of the present invention is a gripping hand having: a base member; and a plurality of fingers arranged about an axis line that passes through or penetrates the base member, wherein each of the fingers has a flexible finger part having flexibility and a finger base member for supporting a basal end side of the flexible finger part, wherein the gripping hand further comprises a plurality of link mechanisms that are supported by the base member or by a member mounted on the base member and that respectively support the plurality of finger base members, and wherein each of the link mechanisms allows the corresponding finger base member supported thereby to move relative to the base member such that orientation of the finger base member supported thereby does not substantially change relative to the base member.

In the first aspect, the finger base member of each of the fingers is supported by the base member or by the member mounted on the base member via the corresponding link mechanism, and each of the link mechanisms allows the corresponding finger base member supported thereby to move relative to the base member such that the orientation of the finger base member supported thereby does not substantially change relative to the base member. In short, the positions of the fingers relative to one another can be changed such that the orientation of the distal end portion of each of the fingers does not substantially change relative to the base member.

For example, when a small object is to be gripped, the plurality of fingers move so as to approach one another such that the orientation of the distal end portion of each of the fingers does not substantially change relative to the base member, whereby the gripping hand can behave as if the base member became substantially narrow. When a large object is to be gripped, the plurality of fingers move away from one another such that the orientation of the distal end portion of each of the fingers does not substantially change relative to the base member, whereby the gripping hand can behave as if the base member became substantially wide.

For this reason, even if the movable range of each of the fingers is small or almost zero, the grasp object can be gripped. In addition, because each of the fingers includes the flexible finger part, even a irregularly shaped and delicate grasp object, such as food, can be gripped appropriately.

The above-described aspect is preferably such that the member mounted on the base member includes a plurality of swiveling members arranged about the axis line, each of the swiveling members is mounted on the base member so as to be swivelable about a swiveling axis extending in a direction substantially along the axis line, and the plurality of link mechanisms are respectively supported by the plurality of swiveling members.

With this configuration, the plurality of fingers are supported on the respective plurality of swiveling members via the link mechanisms, and the swiveling members are swivelable relative to the base member. For this reason, by means of the link mechanisms, it is possible to adjust the positions of the plurality of fingers relative to one another and to adjust the orientations of the fingers about the swiveling axes such that the orientations of the distal end portions of the fingers do not substantially change relative to the base member. This is advantageous in widening the applicable range of the grasp object.

The above-described aspect is preferably such that the gripping hand further includes: a swivel drive device for driving each of the swiveling members about the swiveling axis.

With this configuration, the swiveling members can be swiveled by means of the swivel drive devices, and this is advantageous in reducing the working load and working time for adjusting the orientations of the fingers about the swiveling axes.

The above-described aspect is preferably such that each of the link mechanisms includes parallel links.

With this configuration, the positions of the plurality of fingers relative to one another can be changed such that the orientations of the finger base members do not change relative to the base member. For this reason, it is easier to estimate the orientation of each of the flexible finger parts relative to the base member, affording an advantage in accurately controlling the gripping hand that uses the flexible finger parts.

The above-described aspect is preferably such that the gripping hand further includes: a drive mechanism which moves the finger base member relative to the base member or the swiveling members within a movable range of the corresponding link mechanism.

With this configuration, the finger base members can be moved by means of the drive mechanism, and this is advantageous in reducing the working load and working time for adjusting the positions of the fingers.

The above-described aspect is preferably such that the drive mechanism include: an axial-direction moving member that moves in a direction along the axis line relative to the base member; and at least one drive link member for linking the axial-direction moving member to the finger base member or to a finger-base-member side of the link mechanisms.

Because the plurality of fingers are arranged about the axis line, providing the axial-direction moving member that moves in a direction along the axis line is advantageous in reducing the size of the gripping hand in a direction orthogonal to the axis line, compared with, for example, a case where a moving member that moves in a direction orthogonal to the axis line is provided.

The above-described aspect is preferably such that the drive mechanism move the plurality of finger base members independently from one another relative to the base member or the swiveling members.

With this configuration, the positions of the plurality of finger base members relative to the base member or the swiveling members can be adjusted independently of one another by means of the drive mechanism. This is advantageous in widening the applicable range of the grasp object.

The above-described aspect is preferably such that the gripping hand further includes: a control unit which controls the drive mechanism, wherein the control unit controls the drive mechanism so that each of the finger base members is disposed at a position according to a type of a grasp object.

With this configuration, the positions of the fingers are automatically changed according to the type of the grasp object which is advantageous in enhancing the gripping quality of the gripping hand that uses the flexible finger parts.

The above-described aspect is preferably such that the gripping hand further includes: a control unit which controls the drive mechanism; a fluid supply and discharge device for supplying and discharging a pressure control fluid to and from the interior of each of the flexible finger parts; and a storage device which stores information about correspondence relationship between an amount and a pressure of the pressure control fluid supplied and discharged by the fluid supply and discharge device and changes in behavior and a physical property of the corresponding flexible finger part, wherein the control unit determines a position to which each of the finger base members is moved by means of the drive mechanism by using at least the amount and the pressure of the pressure control fluid supplied and discharged by the fluid supply and discharge device to and from each of the corresponding flexible finger part, and by using the information about the correspondence relationship.

Behavior, such as the amount of deformation, and a physical property, such as the spring constant, of each of the flexible finger parts change according to the amount and pressure of the pressure control fluid that is supplied and discharged to and from the interior thereof. For example, when the amount of the supplied pressure control fluid increases, the amount of deformation of each of the flexible finger parts inwardly of the hand increases, and the spring constant of each of the flexible finger parts increases. For this reason, if the positions of the plurality of finger base members relative to one another are fixed and in the case where grasp objects having various sizes are to be gripped etc., the gripping force exerted on the grasp object differs greatly between the case where a large grasp object is gripped and the case where a small grasp object is gripped.

In contrast, with the above-described configuration, the positions to which the finger base members are moved by means of the drive mechanism are determined by using at least the amount and pressure of the pressure control fluid supplied and discharged by the fluid supply and discharge device to and from each of the flexible finger parts and the information about correspondence relationship. For this reason, it is possible to appropriately adjust the gripping forces exerted on grasp objects having various sizes.

The above-described aspect is preferably such that the gripping hand includes: a fluid supply and discharge device for supplying and discharging a pressure control fluid to and from the interior of each of the flexible finger parts; a storage device for storing information about correspondence relationship between an amount and a pressure of the pressure control fluid supplied and discharged by the fluid supply and discharge device and changes in behavior and a physical property of the corresponding flexible finger part; and a control unit that, when a grasp object is gripped by each of the flexible finger parts, estimates a gripping position at which the grasp object is gripped in each of the flexible finger parts, by using at least the amount and the pressure of the pressure control fluid supplied and discharged by the fluid supply and discharge device to and from the corresponding flexible finger part and the information about the correspondence relationship.

With this configuration, by estimating a gripping position, which is a position, area, etc. where the grasp object is gripped, in each of the flexible finger parts, it is possible to control the gripping position when the grasp object is to be gripped, thus affording an advantage in enhancing the gripping quality.

The above-described aspect is preferably such that the gripping hand includes: a fluid supply and discharge device; and a tube for connecting the fluid supply and discharge device and each of the flexible finger parts, wherein a portion of the tube between the base member and each of the flexible finger parts extends in a direction along the swiveling axis of the swiveling member and is disposed in the vicinity of the swiveling axis.

With this configuration, the tube between the base member and each of the flexible finger parts does not interfere when a movable section of the gripping hand is driven, thereby preventing the tube from being damaged, coming off, etc.

The above-described aspect is preferably such that each of the flexible finger parts is detachably connected to the corresponding finger base member.

Because the flexible finger parts have flexibility, they require frequent replacement and maintenance, compared with metal members. For this reason, a structure that allows the flexible finger parts to be attachably/detachably connected to the finger base members, as described above, is advantageous in reducing the time required for replacement work and maintenance work.

The above-described aspect is preferably such that a basal end of each of the flexible finger parts is provided with a tubular section that has higher rigidity than the corresponding flexible finger part and that is connected to a hollow portion of the corresponding flexible finger part, each of the finger base members is provided with a coupler having a flow channel for supplying and discharging the pressure control fluid to and from the corresponding flexible finger part, and the tubular section of each of the flexible finger parts is detachably connected to the coupler of the corresponding finger base member.

With this configuration, each of the flexible finger parts can be attached and detached by attaching and detaching the tubular section at the basal end of the flexible finger part to and from the coupler of the finger base member, making it possible to reduce the time for replacement work and maintenance work.

The above-described aspect is preferably such that the gripping hand includes: a fluid supply and discharge device; a plurality of fluid flow channels for connecting the fluid supply and discharge device and the respective plurality of flexible finger parts; and a plurality of flow-volume adjusting valves provided at intermediate positions of the respective plurality of fluid flow channels, wherein the plurality of flow-volume adjusting valves for the respective plurality of flexible finger parts are valves whose degrees of valve opening change according to swiveling of the swiveling members of the respective flexible finger parts.

With this configuration, because degree of valve opening adjustment of the flow channel for supplying and discharging a pressure control fluid to and from the flexible finger part of each of the fingers is automatically performed according to the swiveling position of the finger, control processing for sending a control signal to an electromagnetic valve etc. can be omitted, and furthermore the reliability of the degree of valve opening adjustment mechanism can be enhanced by omitting a step of controlling each of the flow-volume adjusting valves with a control signal.

The above-described aspect is preferably such that the gripping hand includes: a control unit for controlling the drive mechanism; and a visual sensor, wherein the control unit determines a position to which each of the finger base members is moved by means of the drive mechanism by using visual data obtained by the visual sensor.

For example, the control unit can adjust the position of each of the finger base members in a direction intersecting the above-described axis line on the basis of the orientation of the grasp object in the visual data. If the grasp object is shaped like a circular column, the gripping quality can be enhanced by changing the position of each of the finger base members between a case where the grasp object is to be gripped in the axial direction and a case where the grasp object is to be gripped in the radial direction.

The above-described aspect is such that the gripping hand includes: a fluid supply and discharge device for supplying and discharging a pressure control fluid to and from the interior of each of the flexible finger parts; a storage device for storing information about correspondence relationship between an amount and a pressure of the pressure control fluid supplied and discharged by the fluid supply and discharge device and an amount of deformation of the corresponding flexible finger part; and a control unit that, when a grasp object is gripped, estimates a position or an area in which the grasp object is gripped in each of the flexible finger parts, by using at least the amount and the pressure of the pressure control fluid supplied and discharged by the fluid supply and discharge device to and from the corresponding flexible finger part and the information about the correspondence relationship.

With the configuration as described above, even if contacts between each of the flexible finger parts and the grasp object are not monitored visually, by means of the visual sensor, etc., it is possible to estimate the position or the area in which the grasp object is gripped in each of the flexible finger parts by using the amount and the pressure of the pressure control fluid supplied and discharged to and from the corresponding flexible finger part, affording an advantage in enhancing, confirming, etc. the gripping quality. In addition, it is also possible to store the estimated gripping position or area as history of gripping quality, so that the history can be used later.

According to the above aspects, various types of grasp objects can be gripped by using flexible fingers that are deformed by supplying and discharging of pressure control fluids.

REFERENCE SIGNS LIST

20 Finger
21 Finger base member
21a Coupler
21b Tube
21c Pathway
21d Hub
21e Tube
21f Tube support member
21g Rotary joint
22 Flexible finger part
22a Gripping wall
22b Stretchable wall
23 Basal end member
23a First member
23b Second member
23c Tubular section
24 Coupler
24a Coupler body
24b Basal-end-side hole
24c Distal-end-side hole
24d Tapered surface
24e Sealing member
25 Locking member
25a Extension/contraction part
25b Flange part
26, 27 Tubular section
30 Parallel link
31 First link member
31a, 31b Swing axis
33 Second link member
32a, 32b Swing axis
33 Urging member
34 Wire (drive link member)
35 Flexible member
35a Basal-end-side member
35b Distal-end-side member
36 Link member
36c First pulley
36d Second pulley
36e Wound member
36f Gear
36g, 36h Swing axis
40 Swiveling member
40a Swiveling axis
40b Notch
50 Base member
51 Flow-volume adjusting valve
51a Revolving axis
52 Valve case
53 First valve element
53a Flow channel
54 Second valve element
54a Flow channel
54b Protruding part
61 First actuator
62, 63 Second actuator
62a Output shaft
70, 80 Axial-direction moving member
71 First drive link member
71a Swiveling axis
72 Second drive link member
72a, 72b Swing axis
73 Shaft (drive link member)
100 Compressor (fluid supply and discharge device)
110 Controller
200 Control device
201 Control unit
202 Display device
203 Storage device
203a System program
203b Operation program
203c Gripping adjustment program
204 Operating panel
CL Hand central line
W Grasp object
G Gap

The invention claimed is:

1. A gripping hand comprising:
a base member; and
a plurality of fingers arranged about an axis line that passes through or penetrates the base member,
wherein each of the fingers has a flexible finger part having flexibility and a finger base member for supporting a basal end side of the flexible finger part, wherein the basal end side further comprises a hollow portion to which a fluid or air can be supplied,
wherein the gripping hand further comprises a plurality of link mechanisms that are supported by the base member or by a member mounted on the base member and that respectively support the plurality of finger base members, and wherein each of the link mechanisms allows the corresponding finger base member supported thereby to move relative to the base member.

2. The gripping hand according to claim 1, wherein the member mounted on the base member includes a plurality of swiveling members arranged about the axis line, wherein each of the swiveling members is mounted on the base member so as to be swivelable about a swiveling axis extending in a direction substantially along the axis line, and wherein the plurality of link mechanisms are respectively supported by the plurality of swiveling members.

3. The gripping hand according to claim 2, further comprising:

a fluid supply and discharge device; and a tube for connecting the fluid supply and discharge device and each of the flexible finger parts, wherein a portion of the tube between the base member and each of the flexible finger parts extends in a direction along the swiveling axis of the swiveling member and is disposed in the vicinity of the swiveling axis.

4. The gripping hand according to claim 2, further comprising:

a fluid supply and discharge device;

a plurality of fluid flow channels for connecting the fluid supply and discharge device and the respective plurality of flexible finger parts; and a plurality of flow-volume adjusting valves provided at intermediate positions of the respective plurality of fluid flow channels, wherein each of the plurality of flow-volume adjusting valves for the respective flexible finger parts is a valve whose valve opening changes according to swiveling of the swiveling member of the corresponding flexible finger part.

5. The gripping hand according to claim 1, further comprising:

a swivel drive device that drives each of the swiveling members about the swiveling axis.

6. The gripping hand according to claim 1, wherein each of the link mechanisms comprises parallel links.

7. The gripping hand according to claim 1, further comprising:

a drive mechanism which moves the finger base member relative to the base member or the swiveling members within a movable range of the corresponding link mechanism.

8. The gripping hand according to claim 7, wherein the drive mechanism comprises: an axial-direction moving member that moves in a direction along the axis line relative to the base member; and at least one drive link member for linking the axial-direction moving member to the finger base member or to a finger-base-member side of the link mechanisms.

9. The gripping hand according to claim 7, wherein the drive mechanism moves the plurality of finger base members independently from one another relative to the base member or the swiveling members.

10. The gripping hand according to claim 7, further comprising:

a control unit which controls the drive mechanism, wherein the control unit controls the drive mechanism so that each of the finger base members is disposed at a position according to a type of a grasp object.

11. The gripping hand according to claim 7, further comprising:

a control unit which controls the drive mechanism;

a fluid supply and discharge device for supplying and discharging a pressure control fluid to and from the interior of each of the flexible finger parts; and a storage device which stores information about correspondence relationship between an amount and a pressure of the pressure control fluid supplied and discharged by the fluid supply and discharge device and changes in behavior and a physical property of the corresponding flexible finger part, wherein the control unit determines a position to which each of the finger base members is moved by the drive mechanism by using at least the amount and the pressure of the pressure control fluid supplied and discharged by the fluid supply and discharge device to and from each of the corresponding flexible finger part, and by using the information about the correspondence relationship.

12. The gripping hand according to claim 7, further comprising:

a control unit for controlling the drive mechanism; and a visual sensor, wherein the control unit determines a position to which each of the finger base members is moved by the drive mechanism by using visual data obtained by the visual sensor.

13. The gripping hand according to claim 1, further comprising:

a fluid supply and discharge device for supplying and discharging a pressure control fluid to and from the interior of each of the flexible finger parts;

a storage device for storing information about correspondence relationship between an amount and a pressure of the pressure control fluid supplied and discharged by the fluid supply and discharge device and changes in behavior and a physical property of the corresponding flexible finger part; and a control unit that, when a grasp object is gripped by each of the flexible finger parts, estimates a gripping position at which the grasp object is gripped in each of the flexible finger parts, by using at least the amount and the pressure of the pressure control fluid supplied and discharged by the fluid supply and discharge device to and from the corresponding flexible finger part and the information about the correspondence relationship.

14. The gripping hand according to claim 1, wherein each of the flexible finger parts is detachably connected to the corresponding finger base member.

15. The gripping hand according to claim 14, wherein a basal end of each of the flexible finger parts is provided with a tubular section that has higher rigidity than the corresponding flexible finger part and that is connected to the hollow portion of the corresponding flexible finger part, each of the finger base members is provided with a coupler having a flow channel for supplying and discharging the pressure control fluid to and from the corresponding flexible finger part, and the tubular section of each of the flexible finger parts is detachably connected to the coupler of the corresponding finger base member.

16. The gripping hand according to claim 1, further comprising:
- a fluid supply and discharge device for supplying and discharging a pressure control fluid to and from the interior of each of the flexible finger parts;
- a storage device for storing information about correspondence relationship between an amount and a pressure of the pressure control fluid supplied and discharged by the fluid supply and discharge device and an amount of deformation of the corresponding flexible finger part; and
- a control unit that, when a grasp object is gripped, estimates a position or an area in which the grasp object is gripped in each of the flexible finger parts, by using at least the amount and the pressure of the pressure control fluid supplied and discharged by the fluid supply and discharge device to and from the corresponding flexible finger part and the information about the correspondence relationship.

* * * * *